(12) United States Patent
Noe et al.

(10) Patent No.: US 10,049,348 B2
(45) Date of Patent: Aug. 14, 2018

(54) TRANSACTION SYSTEMS AND ASSOCIATED METHODS FOR ENHANCED ACCOUNT BALANCE AND STATUS MANAGEMENT

(71) Applicant: MasterCard International Incorporated, Purchase, NY (US)

(72) Inventors: James Noe, West Wickham (GB); Michael J. Cowen, London (GB); Jason Field, London (GB); Sagitha George, Harrow (GB); David A. Roberts, Warrington (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 640 days.

(21) Appl. No.: 14/497,072

(22) Filed: Sep. 25, 2014

(65) Prior Publication Data

US 2015/0095232 A1 Apr. 2, 2015

(30) Foreign Application Priority Data

Oct. 2, 2013 (GB) .................................. 1317479.2

(51) Int. Cl.
| | |
|---|---|
| G06Q 20/10 | (2012.01) |
| G06Q 20/02 | (2012.01) |
| G06Q 20/28 | (2012.01) |
| G06Q 20/34 | (2012.01) |
| G06Q 20/40 | (2012.01) |

(52) U.S. Cl.
CPC ........... *G06Q 20/10* (2013.01); *G06Q 20/023* (2013.01); *G06Q 20/28* (2013.01); *G06Q 20/352* (2013.01); *G06Q 20/40* (2013.01); *G06Q 20/4037* (2013.01)

(58) Field of Classification Search
CPC ...................................................... G06Q 20/10
USPC .......................................................... 705/44
See application file for complete search history.

(56) References Cited

U.S. PATENT DOCUMENTS

| | | | |
|---|---|---|---|
| 7,866,551 B2 * | 1/2011 | Manessis | G06Q 20/10 235/379 |
| 8,042,161 B1 | 10/2011 | Cooley et al. | |

(Continued)

OTHER PUBLICATIONS

Authorized Officer Peter Verhoef, EPO as ISA, International Search Report for PCT/GB2014/052920, dated Dec. 22, 2014, p. 1.

*Primary Examiner* — Lindsay M Maguire
(74) *Attorney, Agent, or Firm* — Otterstedt, Ellenbogen & Kammer, LLP

(57) ABSTRACT

A computer implemented method of performing a transaction using a payment account, typically handled by a payment account manager (PAM), comprises the steps of: receiving a first message from a top up terminal indicating that funds have been transferred to the payment account; setting or adjusting a funds limit of the payment account based on information in the first message; receiving an authorization or pre-authorization request from a first terminal and commencing a funds aggregation; receiving a second message indicating a pre-defined amount of funds which may be used in the transaction; blocking an amount of the funds limit of the payment account equivalent to the pre-defined amount; and sending an authorization response to the first terminal.

10 Claims, 24 Drawing Sheets

(56) References Cited

U.S. PATENT DOCUMENTS

| | | | |
|---|---|---|---|
| 8,376,227 B2* | 2/2013 | Hammad | G06Q 20/045 235/375 |
| 8,523,069 B2* | 9/2013 | Hammad | G06Q 20/045 235/375 |
| 2008/0203152 A1 | 8/2008 | Hammad et al. | |
| 2010/0198728 A1* | 8/2010 | Aabye | G06Q 20/32 705/44 |
| 2010/0312617 A1 | 12/2010 | Cowen | |

* cited by examiner

TRANSACTION SYSTEMS AND ASSOCIATED METHODS FOR ENHANCED ACCOUNT BALANCE AND STATUS MANAGEMENT

CROSS REFERENCE TO RELATED APPLICATIONS

This application claims foreign priority to United Kingdom Patent Application 1317479.2, filed 2 Oct. 2013, the complete disclosure of which is expressly incorporated herein by reference in its entirety for all purposes.

FIELD OF THE INVENTION

The present invention relates generally, but not exclusively, to prepaid account transaction infrastructures, particularly in the context of transit payments using a pay as you go functionality, but they are also applicable more broadly. Such infrastructures primarily enable users to synchronise account balances and statuses between a financial institution responsible for managing the account and another third party (such as a transit agency) and/or transfer data from the third party to another merchant location, this data may be written to the card for subsequent use in the third party's systems.

BACKGROUND TO THE INVENTION

Transport for London (TfL) operates one of the largest closed loop prepaid schemes in the world. An estimated 52 million Oyster™ cards were in circulation as of February 2013.

Oyster is a proprietary transit card that allows the user to store either single ride tickets, season tickets, prepaid balance or a combination of these on it. The system is a card centric one (in that the card ultimately holds the correct and current set of data for that user).

When a user taps their Oyster card on a reader/validator ('tapping in'), the reader attempts to establish the valid products on the card and select the correct one for the journey from that location. When using the prepaid element (referred to as Oyster Pay as you Go (or just PAYG)) the reader firstly looks to see if there are sufficient funds on the card to pay for the minimum fare from that point. If there are sufficient funds, the maximum fare is deducted (except on buses and trams which are fixed fares). This deduction of the maximum fare may cause the cardholder to go 'overdrawn' but acts as an incentive to always tap out. When touching out of the transit network ('tapping out'), the reader will calculate the fare and update the balance on the card accordingly.

On 13 Dec. 2012, TfL launched contactless payment on their 9,000 buses enabling any contactless card capable of performing offline transactions (i.e. does not need to go online for transaction authorisation) to be used to pay for a single bus fare. The transaction process that takes place is equivalent to that of a standard offline retail payment. TfL intends to extend this service to other transport modes, such as the train, tube (underground), tram, and Docklands Light Railway in early 2014, though this will use a different transaction model and will additionally support cards requiring an online authorisation.

TfL are in the process of updating their current infrastructure so that any contactless payment chip card may be used to make payments on their public transport services. A suitable transaction model would allow the user to use pay as you go functionality on their standard issue credit/debit/prepaid/charge cards rather than having to have a separate, purpose issued card (such as an Oyster™ card).

Currently, seasons tickets are only available in paper ticket form or on Oyster™ cards. In the longer term, TfL are looking link contactless payment cards to season tickets. Current systems require season ticket information to be stored on the ticket or card. Linking season tickets to contactless payment cards would enable such information to be managed externally of the payment card allowing for improved and centralised management of information.

Eventually, many expect such technology to supersede existing paper ticket and Oyster™ card systems. However, there are users who do not have access to a bank account, don't have access to a contactless payment card or who don't want to use a contactless card which is directly linked to their bank accounts. Additionally there are some users who are entitled to discounted or free travel for which a bank issued card may not be suitable.

For this to happen, any new transaction model which is designed to replace the Oyster™ card system will ultimately need to perform at least as well as the Oyster™ card system (or any equivalent system in any other city where such a system may be implemented). There are currently certain ways in which an Oyster™ card user can manage a Pay as you Go account which could not be handled as efficiently by existing contactless payment card systems, For example, people who manage their Oyster™ card balances close to zero are often denied entry at ticket barriers and, subsequently, top up their Oyster™ cards at a top up location with an amount equivalent to the cost of their intended journey or journeys, the amount being immediately loaded onto their cards, and then proceed through the barriers. As described in greater detail above, only the minimum fare must be available to enable the commencement of a journey, but the maximum fare is deducted when a user taps in at a terminal. The fare is calculated and the balance updated on exit.

Current credit/debit/prepaid/charge card (hereafter, 'payment card') pay as you go transaction models are unable to match this functionality. The risk is managed through periodic authorisations which, if approved, provide the transit agency, e.g. TfL, with protection up to a certain value, £20 in the case of UK transit agencies such as TfL (as of September 2013), with the card issuer accepting all liability for all transit spend up to that amount if they approve the authorisation. For users who manage the balances of their accounts below the liability value, say at £5, the issuer may well decline the transit authorisation as they wouldn't want to take on the risk of losing money.

However, an Oyster™ card would allow a person with the £5 in their account to make a £1.40 journey. Accordingly, current payment card pay as you go transaction models do not provide the same functionality as the Oyster™ card system and would therefore not be considered as a suitable alternative for a purpose issued transit card to address the needs of the unbanked, those without a contactless function on their bankcard or those who chose not to use their bank issued contactless card.

Current payment card pay as you go transaction models may operate using a Deny List. This is a list of cards blocked for travel for a variety of reasons including insufficient funds, lost or stolen cards, repeated fare evasion or staff abuse. TfL currently holds their Deny Lists at each of their readers across London. The speed with which these lists can be updated is limited by the network architecture of the transit agency. It may take up to half an hour for lists to be updated.

Accordingly, a problem can arise where a user with insufficient funds in their account tries to make a payment at a reader using their payment card and is, subsequently, placed on a Deny List. When the user has then transferred sufficient funds into the account to which their payment card is linked, they will be unable to make a journey until the Deny List at the reader has been updated. Furthermore, additional actions are typically required by the user to inform the transit agency (such as TfL) that they have now added funds to the account and that they would like to be removed from the Deny List. At this point, the transit agency must perform a check with the user's card issuer to check that it is indeed OK for the card to be removed from the Deny List. If the issuer grants such approval then (in the case of TfL) the Deny List update may take up to half an hour, during which time the user will be unable to use the transportation system.

SUMMARY OF THE INVENTION

According to a first aspect of the invention, there is provided a computer implemented method of performing a transaction using a payment account, the method comprising the steps of: receiving a first message from a top up terminal indicating that funds have been transferred to the payment account; setting or adjusting a funds limit of the payment account based on information in the first message; receiving an authorisation or pre-authorisation request from a first terminal and commencing a funds aggregation; receiving a second message indicating a pre-defined amount of funds which may be used in the transaction; blocking an amount of the funds limit of the payment account equivalent to the pre-defined amount; and sending an authorisation response to the first terminal.

This method may be performed by a payment account manager.

Advantageously, the method of the first aspect enables a pre-defined amount to be blocked from the funds limit of the payment account. In known systems a standard nominal amount is authorised and an amount based upon card schemes' liability limits may be blocked—this amount may not be based upon any information sent in the message.

In one embodiment, information detailing any existing funds in the payment account may also be used to set or adjust the funds limit of the payment account in conjunction with the information in the first message.

In one embodiment, the first message may not exist and the funds limit of the payment account may be set or adjusted based on information detailing any existing funds in the payment account.

Any information detailing any existing funds in the payment account may be obtained by interrogating the payment account.

The method may further comprise the steps of: receiving a third message from a second terminal indicating an actual amount of funds used; and adjusting the blocked amount of the funds limit of the payment account if the actual amount of funds used differs from the pre-defined amount.

In one embodiment, the second terminal may be part of the first terminal.

The method may also or instead further comprise the step of sending a message to the first terminal indicating an updated, unblocked amount of the funds limit. In this instance, the message indicating the updated, unblocked amount of the funds limit may optionally only be sent if the unblocked funds limit falls below or rises above a threshold amount.

In one embodiment, the method further comprises the step of placing the payment account on a Deny List if an unblocked amount of the funds limit is less than a minimum possible actual amount of funds used. In this embodiment, the method may further comprise the steps of: receiving a fourth message from a top up terminal indicating that further funds have been transferred to the payment account; setting or adjusting the funds limit of the payment account based on the information in the fourth message; and removing the payment account from the Deny List if an unblocked amount of the funds limit of the payment account exceeds a minimum possible actual amount of funds used. Optionally, the method further comprises the step of continuing with the funds aggregation following removal of the payment account from the Deny List.

In one embodiment, the funds limit of the payment account is set based on information detailing any existing funds in the payment account as well as information in the first message.

In one embodiment, the pre-defined blocked amount of the funds limit is equivalent to either an average value or a maximum value or a typical maximum value for the actual amount of funds used at the first terminal.

Advantageously, this means that the method can be optimised to suit specific criteria.

In one embodiment, the step of setting or adjusting the funds limit additionally takes into account any deposit that may previously have been paid into the payment account.

In one embodiment, the method further comprises the step of sending the funds aggregation and clearing the payment account of any remaining blocked funds and adjusting the funds limit accordingly.

It will be understood that multiple messages such as the second message may be received before any clearing of the payment account is performed.

In one embodiment, the authorisation or pre-authorisation request and the second message comprise a single message.

According to a second aspect of the invention, there is provided a computer implemented method of handling funds on a payment account, the method comprising the steps of: receiving a first message from a first terminal indicating that a specified amount of funds are required; sending a second message to the first terminal indicating that the required funds are not available; receiving a third message from a top up terminal indicating that funds have been added to the payment account; and sending a fourth message to the first terminal indicating that there are now sufficient funds in the payment account; receiving data from the first terminal; and sending the data to the top up terminal to be written to a payment account payment means.

This method may be performed by a payment account manager.

The data may be provided by a transit back office in communication with the top up terminal.

The data may comprise Deny List bypassing data. In one embodiment, the Deny List bypassing data may enable the payment account payment means to bypass the Deny List for a specified period.

According to a third aspect of the invention, there is provided a computer implemented method of handling funds on a payment account, the method comprising the steps of: sending a first message to a payment account manager (PAM) indicating that a specified amount of funds are required; receiving a second message from the PAM indicating that the required funds are not available; receiving a third message from a top up terminal, optionally via the PAM, indicating that funds have been added to the payment account; creating Deny List bypassing data; and sending the Deny List bypassing data to the top up terminal, optionally via the PAM, to be written to a payment device linked to the payment account.

This method may be performed by a transit agency infrastructure, or indeed an infrastructure belonging to any other suitable type of agency.

Data other than just the Deny List data may be written to the payment device.

According to a fourth aspect of the invention, there is provided a computer implemented method of handling funds on a payment account, the method comprising the steps of: receiving a first message from a first terminal indicating that a specified amount of funds are required and transmitting the first message to a payment account manager (PAM); receiving a second message from the PAM indicating that the required funds are not available and transmitting the second message to the first terminal; receiving a third message from a top up terminal indicating that funds have been added to the payment account and transmitting the third message to the PAM and/or the first terminal; optionally receiving a fourth message from the PAM indicating that sufficient funds are now available and transmitting the fourth message to the first terminal; receiving Deny List bypassing data from the first terminal, optionally transmitting it to the PAM; and transmitting the Deny List bypassing data to the top up terminal to be written to a payment device linked to the payment account at the top up terminal.

This method may be performed by a transit agency infrastructure, or indeed an infrastructure belonging to any other suitable type of agency.

Data other than just the Deny List data may be written to the payment device.

According to a fifth aspect of the invention, there is provided a transaction processing system comprising at least one top up terminal, at least one first terminal, and at least one processor configured to perform the method according to the first aspect of the invention.

Optionally, the at least one processor is hosted by a payment account manager.

According to a sixth aspect of the invention, there is provided a transaction processing system comprising at least one top up terminal, at least one first terminal, and at least one processor configured to perform the method according to the third aspect of the invention.

According to a seventh aspect of the invention, there is provided a payment account manager configured to perform the method according to the second aspect of the invention.

BRIEF DESCRIPTION OF DRAWINGS

Embodiments of the present invention will now be described, by way of example only, with reference to the accompanying drawings, in which.

DETAILED DESCRIPTION

The present invention provides a system and computer implemented method that prevents the above outlined scenario, namely where a user is unable to make a journey until they have been removed from a Deny List, which can occur in known payment card pay as you go transaction models and where a user wishes to manage their balance close to zero (e.g. with only the fare required to make their journey).

It should be noted that whilst the drawings show the use of the system in a transit system, it is not to be taken that this is the only use of the invention. For example, the invention may be equally applicable to loyalty scheme systems.

Figure 1:
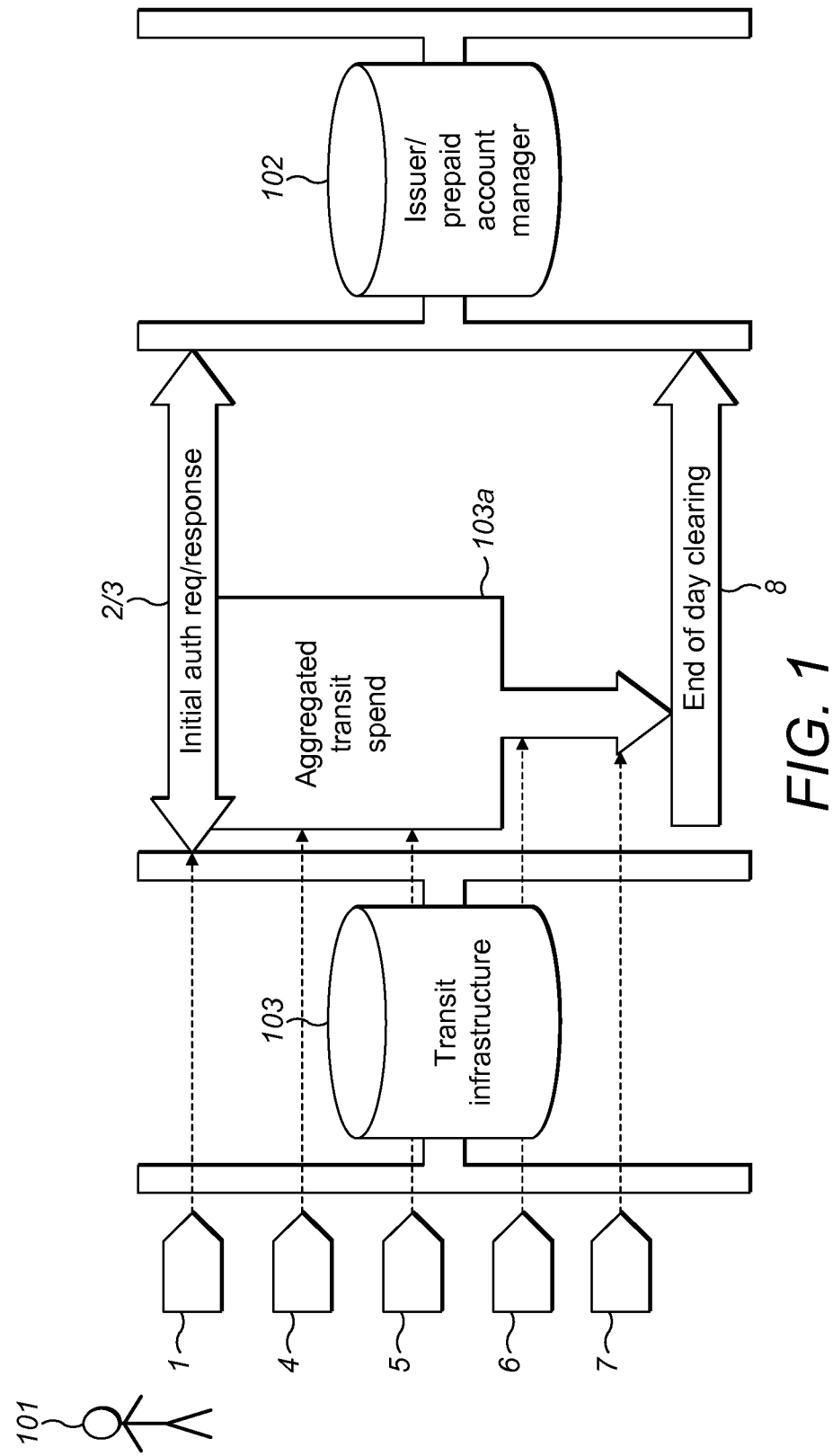
FIG. 1 is a diagram showing the parties involved in known payment card pay as you go transaction models for transit applications and a simplified version of how they interact.

FIG. 1 is a diagram showing the parties involved in known payment card pay as you go transaction models for transit applications and a simplified version of how they interact. FIG. 1 depicts a user 101 who holds a prepaid account with a prepaid account manager (PPAM) 102 that manages the current cleared and uncleared balances of the user (101), a transit agency infrastructure (TAI) 103 comprising transaction infrastructure (including payment terminals and top up terminals) supported by a transit back office all belonging to a transit agency and which manages the Deny List, and a cognitive transit aggregator 103a responsible for (amongst other things) fare calculation. The cognitive transit aggregator 103a may be managed by the transit back office and may be owned and operated by the transit agency, or it may be operated by a third party provider.

FIG. 1 shows how a user's first 'tap in' (step 1), in this instance to undertake a rail journey, on a given day at the transit infrastructure 103 (i.e. at a contactless terminal). Once the card is tapped at a reader or validator, it is locally authenticated using standard Chip card technology to authenticate the card and it is determined whether or not the card is on the Deny List. A zero value transaction is also performed. If the card is successfully authenticated, the zero value transaction is successful and the card is not on the Deny list, the user 101 will be allowed to commence their journey. Data associated with the tap is then sent to the transit infrastructure 103. Once the tap data arrives at the transit infrastructure 103, the cognitive transit aggregator 103a will examine the tap data and determine if an initial authorisation is required. Upon a set of pre-defined risk-based rules, the cognitive transit aggregator 103a may then initiate an initial authorisation request (step 2). That initial authorisation request commonly includes a request for authorisation of a nominal amount of, say, £0.10 and may include other indicators in the transaction message so that the PPAM 102 (or indeed any issuer) can clearly identify the transaction as a transit 'aggregation' transaction. The request is sent to the PPAM 102 by the TAI 103. The PPAM 102 may then block an amount from the user's account for which it is accepting liability (not shown), e.g. £20, and responds with an authorisation response (step 3) that it sends back to the TAI 103. If the PPAM 102 has approved the transaction, then the user 101 may continue to travel unabated, however should the PPAM 102 decline the transaction then the user 101 should be added to the Deny List (not shown) and prevented from making any further journeys until such time as they have restored their account to good standing When the user 'taps out' at the end of their rail journey (step 4), again at the TAI 103, the cost of the journey is recorded by the TAI 103. The user 101 may undertake several further journeys, for example a bus journey (step 5), which is set at a fixed price and only requires a single tap, and a further rail journey (steps 6 and 7), which requires a tap in at the beginning of the journey followed by a tap out once the journey has been completed. The transit aggregator 103*a* adds up the total amount of journeys.

Typically, at the end of a given day (i.e. after the last possible journey in the given day has been completed), a clearing process is undertaken (step 8) where all of the aggregated costs are debited from the user's account (not shown). The clearing process may equally take place at any point in a given day. It is also possible in some systems where one authorisation (step 2, step 3) may permit multiple clearings (step 8) over several days. Such systems are known and some transit agencies, such as TfL are planning to implement such systems in the near future.

Note that in some instances, steps 2 and 3 may be bypassed on a given day if the card scheme rules allow (e.g. either by the TAI 103 not undertaking a clearing process on a daily basis and allowing the aggregation to continue across multiple days or the TAI 103 enabling a clearing process to take place multiple times per single authorisation. In this latter case, subsequent risk management authorisations will be required from time to time).

Figure 2:
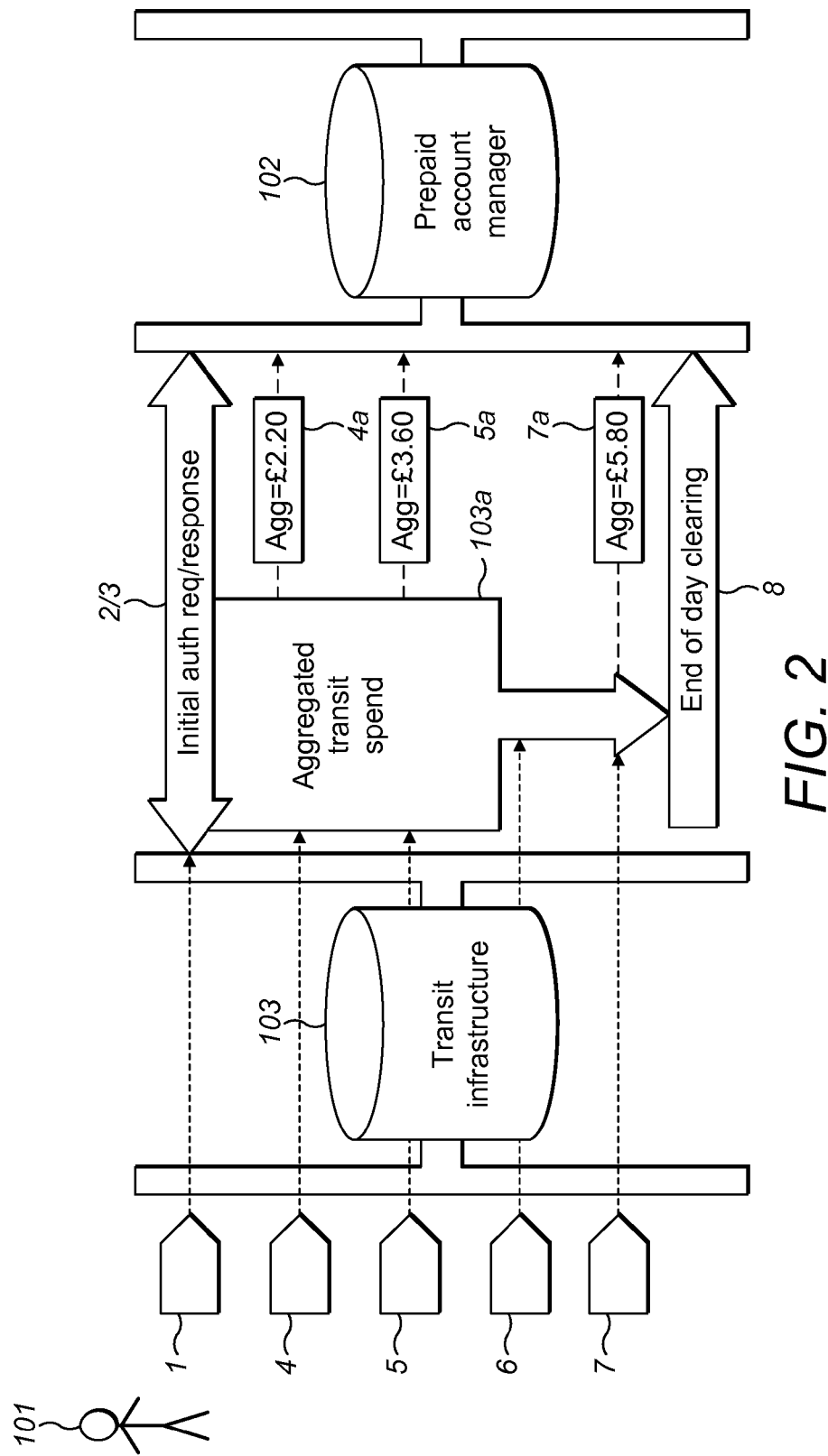
FIG. 2 is a diagram showing the parties involved in payment card pay as you go transaction models for transit applications in accordance with an exemplary embodiment of the present invention.

FIG. 2 is a diagram showing an embodiment of this invention. The parties involved are the same as those of FIG. 1. However, an enhanced bilateral communication between the TAI 103 and the PPAM 102 has been introduced.

Steps 1 to 4 are similar to the steps taken in the system of FIG. 1. The user's first 'tap in' (step 1) of a given day at the transit infrastructure 103 initiates an initial authorisation request (step 2) which is sent to the PPAM 102 by the TAI 103—however, as in FIG. 1, the user will be permitted to travel so long as their card is genuine and they are not on the Deny List.

In this invention, however, rather than sending a nominal amount, e.g. £0.10, the TAI 103 sends an amount representing a normal maximum fare from their current location (for example the TAI 103 may determine that from the user's current location the typical user will not pay more than £6.50, however there may be an absolute maximum fare that may be significantly higher than this amount but this would only be carried out by a very small minority of passengers. In this example, the TAI 103 would include £6.50 as the transaction amount in step 2). The PPAM 102 then blocks an amount from the user's prepaid account equivalent to this normal maximum fare and responds to the authorisation request with an authorisation response (step 3) which it sends back to the TAI 103.

The authorisation response may include the available balance of the user. The TAI 103 may interpret the authorisation response in step 3 in the same way as it was interpreted in FIG. 1 (i.e. an approved authorisation allows the TAI 103 to start a new aggregation period whereas a declined authorisation would typically involve the TAI 103 from blocking the user from subsequent travel (e.g. by the use of the Deny List)).

When the user 'taps out' (step 4), again at the TAI 103, the cost of the journey is recorded by the TAI 103. However, following step 4, the TAI updates the PPAM by sending information indicating the cost of the last journey made by the user 101 (step 4*a*). Once the cost of subsequent journeys 5 and 6/7 is known they are again aggregated, as in the model of FIG. 1, however, the TAI 103 now sends the aggregated cost and/or the individual journey cost to the PPAM 102 (steps 5*a* and 7*a*). Accordingly, the PPAM 102 is provided with detailed information of the user's transit activity throughout the day. This information enables the PPAM 102 to produce much more detailed risk analyses of the users to which it provides prepaid accounts.

At the end of a given day, a clearing process is undertaken (step 8) where all of the aggregated costs are debited from the user's account (not shown).

Additionally (and not shown in FIG. 2), the PPAM 102 may send messages to the TAI 103 indicating that the user's available balance has dropped below one of a set of predefined thresholds. The TAI 103 may then decide to prevent the user from travelling until such point as the PPAM 102 informs the TAI 103 that the account is once again in good standing. Another message that may be sent to the TAI 103 may be to indicate that a card has been reported as lost/stolen.

Figure 3:
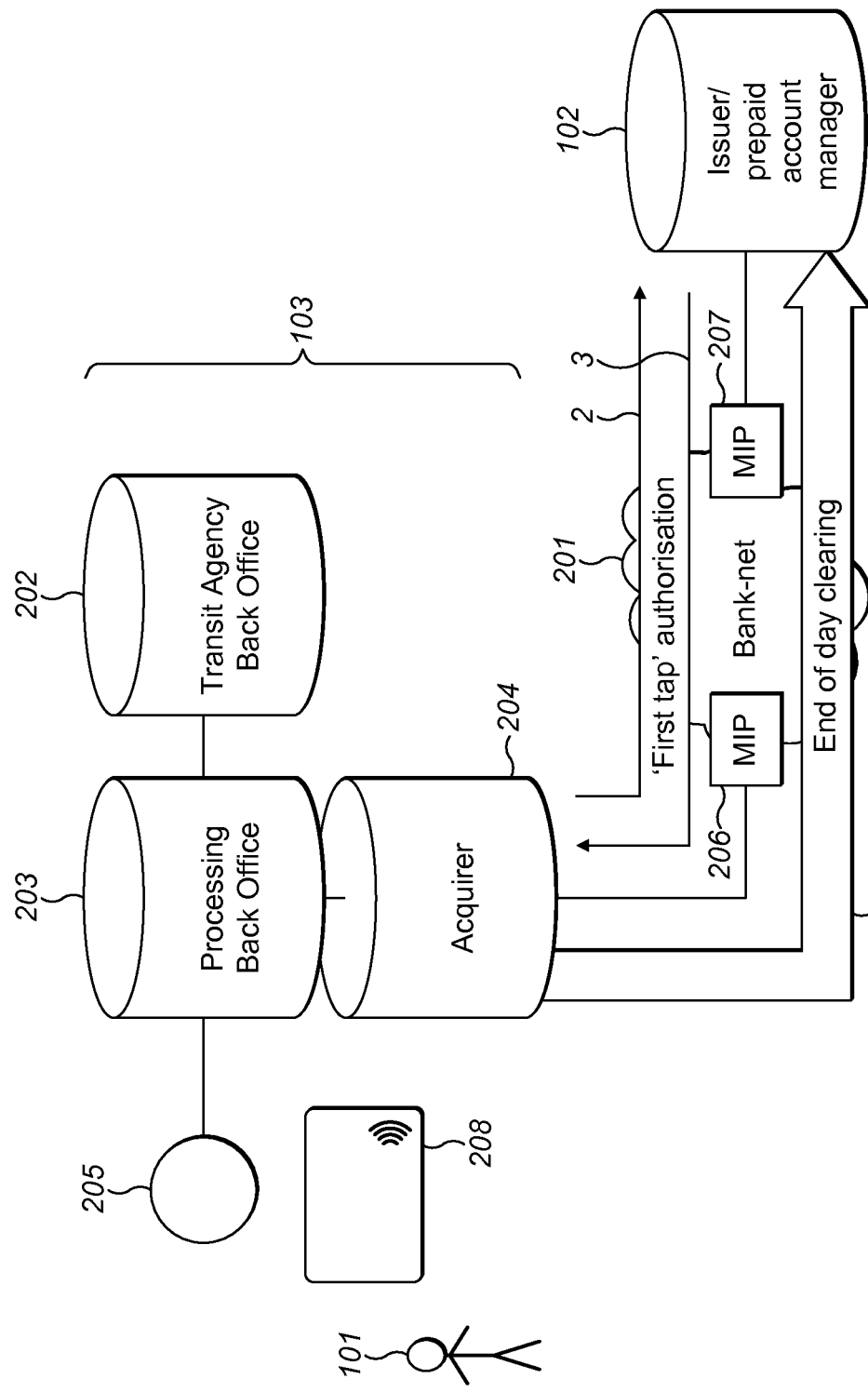
FIG. 3 is a diagram showing the parties of a known system such as the system of FIG. 1, but in greater detail.

FIG. 3 is a diagram showing the parties of a known system such as the system of FIG. 1 in greater detail, namely, the TAI 103, the PPAM 102 and an intermediary network 201 which further comprises an acquirer interface platform 206 and a PPAM interface platform 207 such as the Master-Card™ Interface Platform. These interface platforms facilitate the communication of the TAI 103 and the PPAM 102 with the intermediary network 201. The TAI 103 comprises a transit back office 202, transaction infrastructure 203 and an acquiring account manager 204. The transaction infrastructure 203 may be part of the transit agency's systems or may be outsourced to a separate service provider. The acquiring account manager 204 is a third party that provides a mechanism to allow a merchant (e.g. transit agency) to send transactional data across a payment network (e.g. intermediary network 201) to an issuer (e.g. PPAM 102) for authorisation, clearing and settlement and which interacts with the PPAM 102 on behalf of the transit agency. Also shown are an exemplary terminal 205 which is part of the TAI 103 and a payment card (payment card) 208 held by to the user 101.

It will be understood that, wherever the use of a form of payment card is described throughout the description, any payment device with suitable contactless payment functionality is also envisaged. For example, a mobile phone, tablet computer, key fob, sticker, watch, bracelet or any other device contained within a non-card form factor and with contactless payment functionality may be used.

Although the specific examples described refer to a prepaid account and a prepaid account manager (PPAM), the invention may also be applied to any suitable form of payment account, linked to a payment device. Thus, for such payment accounts, the PPAM is more generally referred to as a payment account manager (PAM).

FIG. 3 shows how the TAI 103 communicates with the PPAM 102 via intermediary network 201. This simplified diagram shows the exemplary steps of the first 'tap in' authorisation request (step 2), the authorisation response (step 3) and the end of day clearing (step 8).

A disadvantage of such systems as described in FIG. 3 for use in systems as described in FIG. 2 is that the load on the acquiring account manager 204 as a result of any intermediate aggregation messages and any Deny List management actions may be considerable, especially during peak use of the transit agency's transport system. The third party acquiring account manager 204 is thus likely to pass on the additional cost for dealing with this load to the TAI 103.

Figure 4:
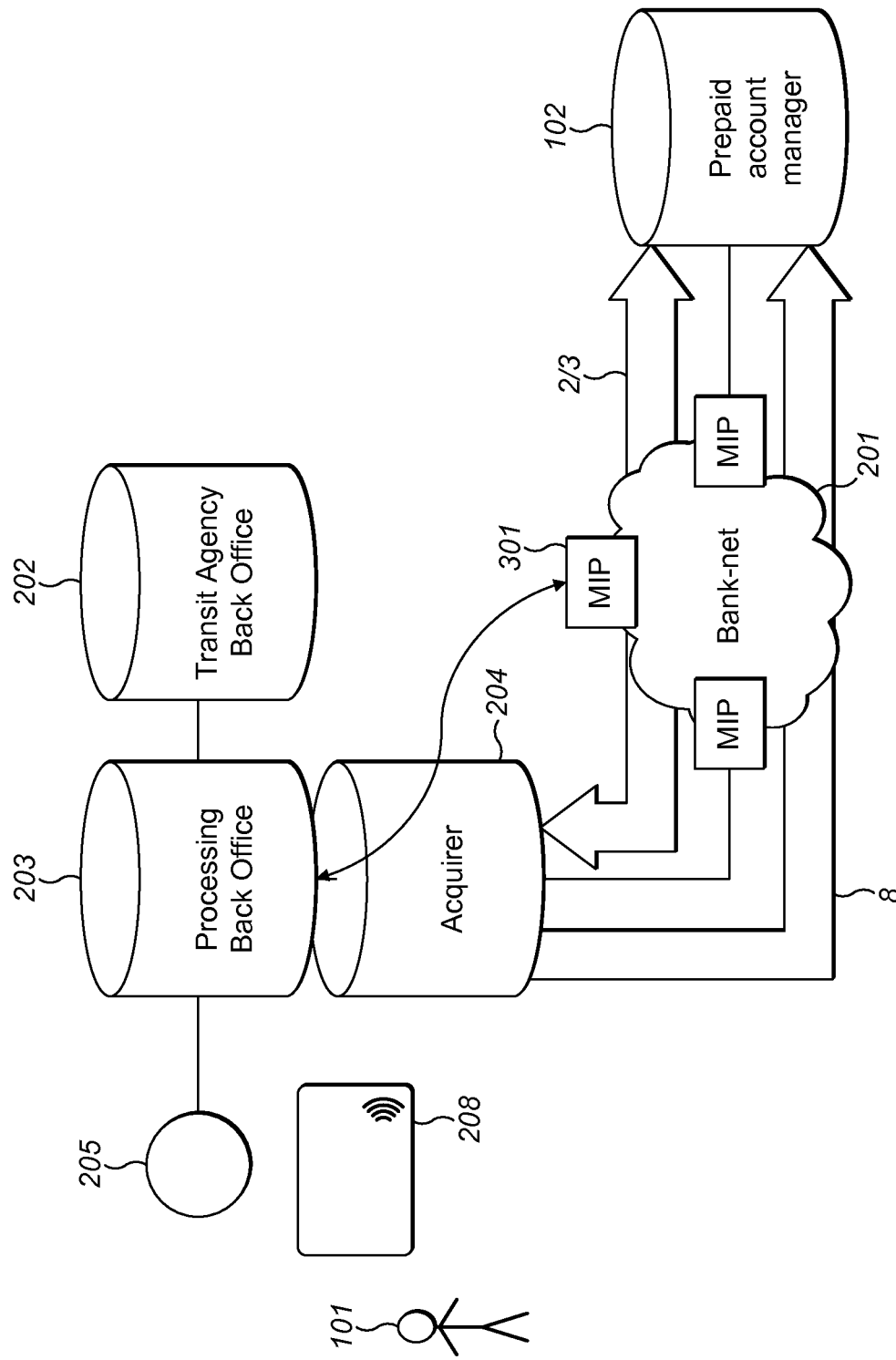
FIG. 4 is a diagram that shows a system, such as the system of FIG. 2, but in greater detail in accordance with an exemplary embodiment of the present invention.

FIG. 4 is a diagram that shows a system according to an embodiment of this invention. The system of FIG. 4 is similar to the system of FIG. 3, but further comprises an additional transaction infrastructure interface platform 301 which enables direct communication between the transaction infrastructure 203 and the PPAM 102 via the intermediary network 201.

As such, the load on the acquiring account manager 204 is avoided and, as a result, any potential additional costs to the acquiring account manager 204 are also avoided.

Alternatively, a direct connection between the transaction infrastructure 203 and the PPAM 102 may be created.

In order to remain compliant with industry standard security requirements (such as Payment Card Industry Data Security Standard (PCI DSS)) the TAI's transit back office 202 and their readers 205 may implement some way of obfuscating the card number (Primary Account Number or simply PAN). Typically an existing form of tokenisation may be employed whereby the PAN is fed into a mathematical algorithm to create a [reasonably] unique identifier. Such an identifier should not readily allow any malicious individual or group to retrieve the original PAN.

Such tokenisation allows an easy way for TAIs 103 to manage their PCI requirements, however there remains a need to translate the tokenised card details that are used whilst travelling and in the fare calculation back into the original PAN such that it may be used to facilitate a payment transaction.

This operation is typically done in a secured environment at the TAI'S transaction infrastructure 203. This process ensures that clear card data is never able to be retrieved at a card reader 205 (or any equivalent ticket/revenue inspection device) or via a member of the TAI's staff employed at the back office 202. Staff engaged at the transaction infrastructure 203 would likewise not typically be able to access the clear PAN data due to the secured environment.

Alternatively, a direct connection between the transit back office 202 and the PPAM 102, via the intermediary network 201 and through an additional interface platform, may be created. This would require the transit back office 202 to handle the PCI DSS burden by implementing PAN tokenisation techniques similar to or the same as those described above.

Alternatively, a direct connection between the transit back office 202 and the PPAM 102 may be created, however this would create the same PCI DSS issues as above.

All of the alternative options also avoid the above mentioned load on the acquiring account manager 204 and, as a result, any potential additional burdens on the acquiring account manager 204 are also avoided. However such a configuration would still function with the other aspects of this invention and need not be entirely excluded by a TAI 103 wishing to implement this.

The intermediary network 201 may be a network run by a third party such as the Banknet™ network run by MasterCard™.

Alternatively, a purpose developed application programming interface (API) or a purpose developed web API may be used instead of the intermediary network 201.

FIGS. 5 to 24 are a series of flow diagrams which represent processes which exemplify the system and method of the present invention.

Each of these Figures shows a clock which provides an indication of an exemplary time of day at which the process shown in that Figure might occur. The times shown are not required times and it will be understood that each process shown in each Figure may occur at any time of day.

Whilst the 'uncleared' funds are shown as split into 'uncleared retail spend' and 'uncleared transit spend' in some of these Figures (see e.g. FIG. 11), this is only for illustrative purposes and to ease understanding. The cardholder would preferably only see a single 'uncleared funds' balance representing a total of all uncleared spend and a single 'open to buy' balance representing any remaining available funds.

Any amounts or thresholds for alerts are merely demonstrative and would likely be based upon an agreement between the transit agency and the PPAM.

All of FIGS. 5 to 24 show the interactions between a top up terminal 501, a transport payment terminal 502, a retail payment terminal 502a and a prepaid account 503 managed by a PPAM 102 via the above mentioned intermediary network 201.

The transport payment terminal 502 forms part of the TAI 103. There are likely to be multiple transport payment terminals 502 in any one TAI 103. The TAI 103 interacts with external entities and in FIGS. 5 to 24 where the transport payment terminal 502 is shown as sending and receiving messages, this is taken to represent the wider TAI 103 as a whole sending and receiving messages, not necessarily the transport payment terminal 502 itself.

The top up terminal 501, transport payment terminal 502 and retail payment terminal 502a may all be part of the TAI 103 belonging to and/or be operated by the transport agency and such terminals may be located at premises belonging to the transport agency. However, the top up terminal 501 and retail payment terminal 502a would typically be operated by and/or belong to third parties, and be located outside of the transport agency premises, for example at a merchant retailer premises, and would typically be completely independent of the TAI 103. This invention looks at how use at these locations may (through the intermediary network 201 and the PPAM 102) be communicated to the TAI 103 in a suitable way (for example the TAI 103 need not be aware of the purchase a user made in the standard retail environment, but would need to be aware if that purchase meant that there were now insufficient funds for a journey on the network).

Throughout this section where a top up terminal 501 is referred to as a terminal, it should also be taken to mean the top up location. Typically terminals do not communicate directly with the intermediary network 201. For the exemplary purposes and those of simplicity the merchant and their acquirer are excluded from the drawings and explanations, but should be taken to form part of the top up location or top up terminal 501.

The above also applies to the retail location and retail terminal 502a.

Where any of these components are described as sending messages or information, for example to the intermediary network 201 or the PPAM 102, it should be understood this also refers to the TAI 103 as a whole sending the message or information.

Figure 5:
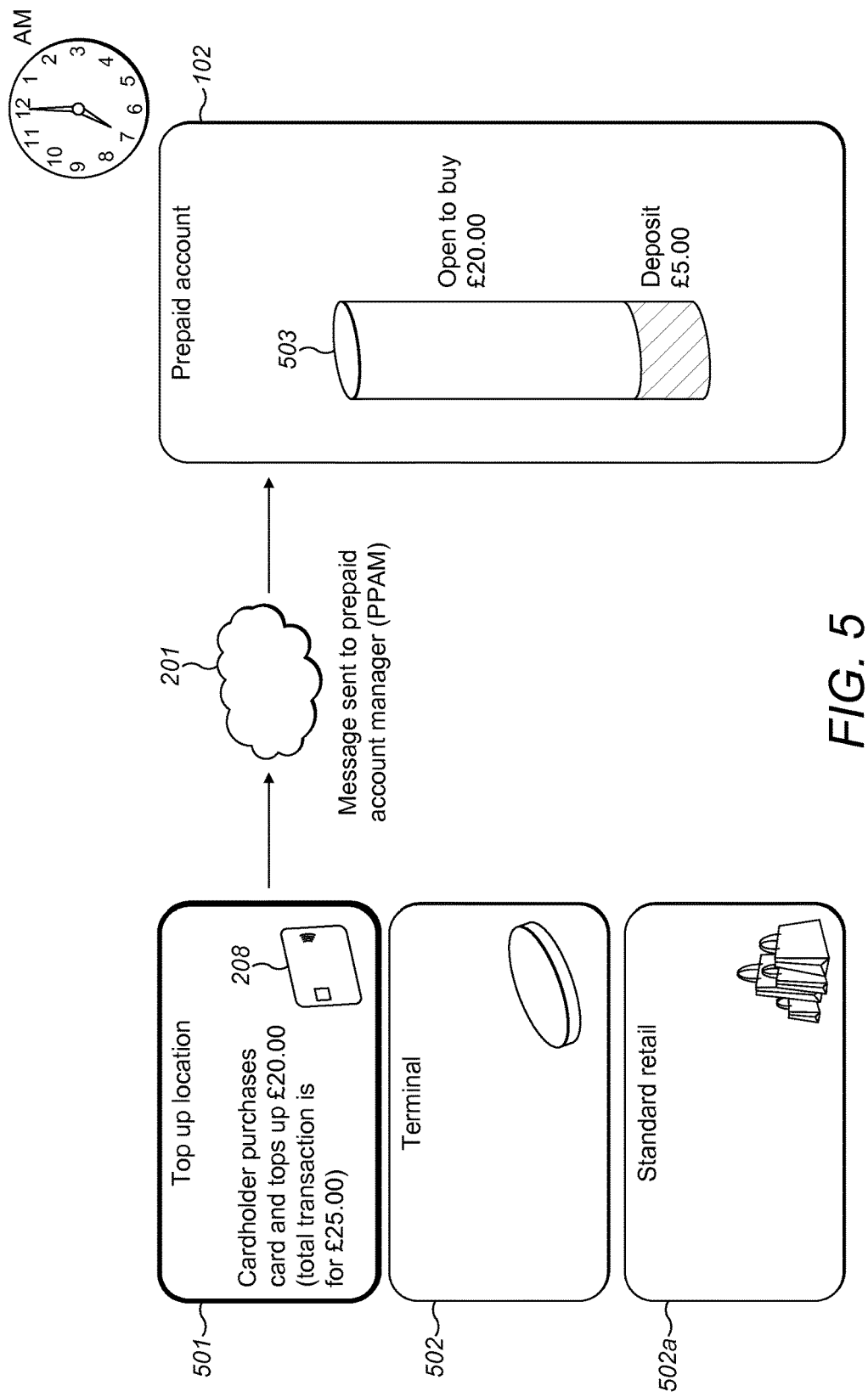
FIGS. 5 to 24 show the interactions between a top up terminal, a transport payment terminal, a retail payment terminal and a prepaid account managed by a PPAM via an intermediary network in accordance with an exemplary embodiment of the present invention.

FIG. 5 shows a user 101 purchasing/acquiring a payment card 208 linked to a prepaid account 503 managed by the PPAM 102. The user 101 pays a deposit of £5 for the card and tops up the card with a further £20 at top up terminal 501. The deposit and top up amount may of course be of any suitable value and it will be understood that these values are illustrative only.

A message is then sent by the top up terminal 501 to the PPAM 102 indicating that a top up of £20 has been made. The PPAM 102 then creates an open to buy (funds limit) in the prepaid account 503 of £20 and records also the deposit of £5.

Figure 6:
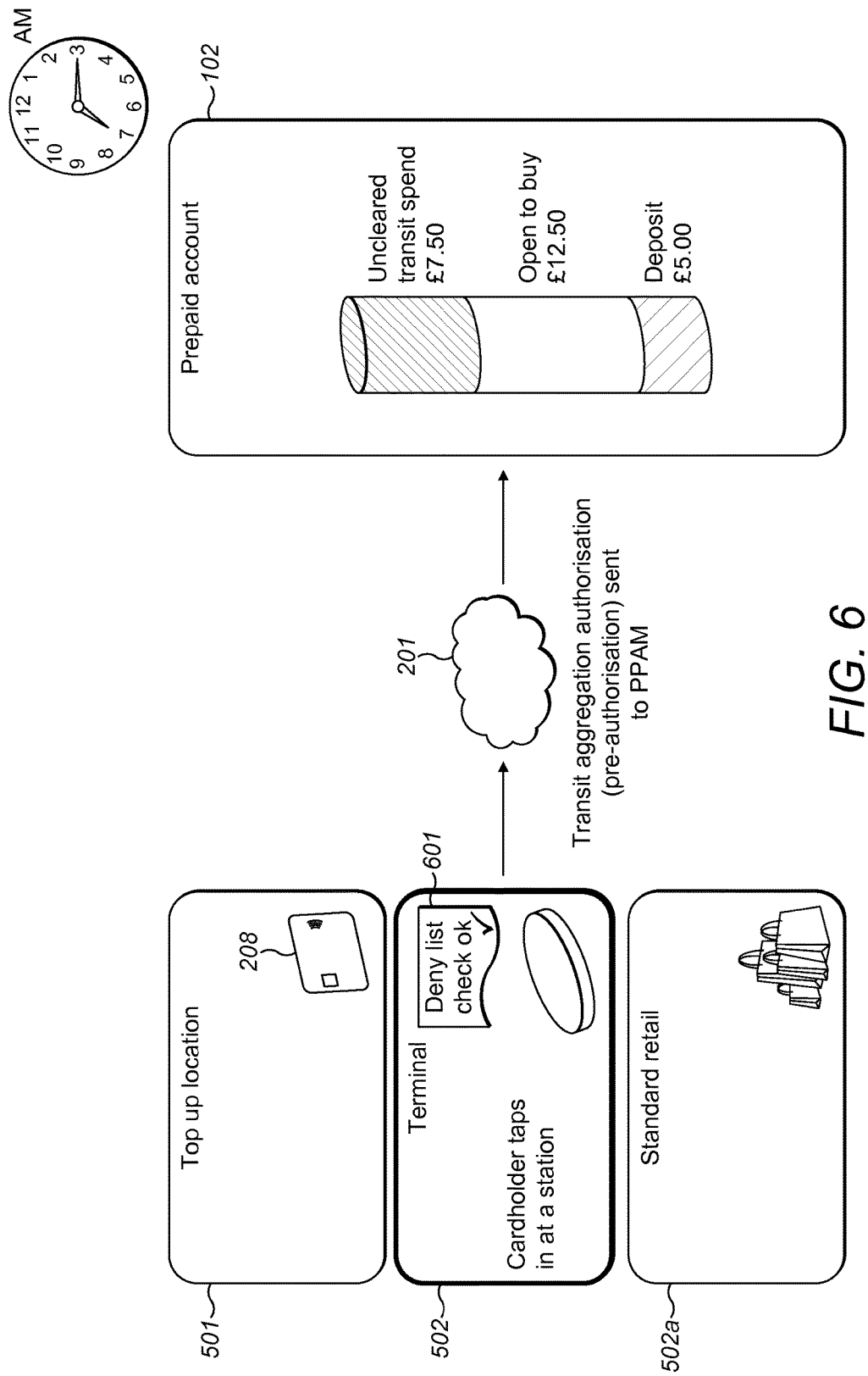

FIG. 6 shows a user 101 tapping their payment card 208 at a transport payment terminal 502 to begin a journey ('tapping in'). Here standard card checks are performed, these being any suitable known and/or currently used card checks, and the card is checked against a Deny List 601. If the checks are successful, the user 101 is allowed to commence their journey. The TAI 103 then sends a transit aggregation authorisation (or pre-authorisation) request to the PPAM 102 via the intermediary network 201.

An amount representing a normal maximum fare from the specific transport payment terminal 502 is sent from the TAI 103 to the PPAM 102 alongside or as part of the authorisation or pre-authorisation request. An exemplary amount would be £7.50. The PPAM 102 would then block £7.50 from the open to buy (funds limit) of the prepaid account. The use of a normal maximum provides the PPAM 102 with information which enables it to better manage the open to buy balance of the user's account.

As explained above, in existing transaction systems, the amount sent to the PPAM 102 for authorisation alongside or as part of the pre-authorisation request is just a nominal amount, such as £0.10. A known PPAM would then normally block the value for which they are accepting liability e.g. £20.

Accordingly, the present invention provides the PPAM 102 with an indication of an accurate, appropriate amount to block from the prepaid account 103, whereas existing transaction systems do not. This has consequences for the account holder in that it is less likely that they will have a transaction denied for lack of funds and consequently provides a reliable mechanism for managing those users who manage their accounts with only sufficient funds for their travel (e.g. a balance close to zero).

Figure 7:
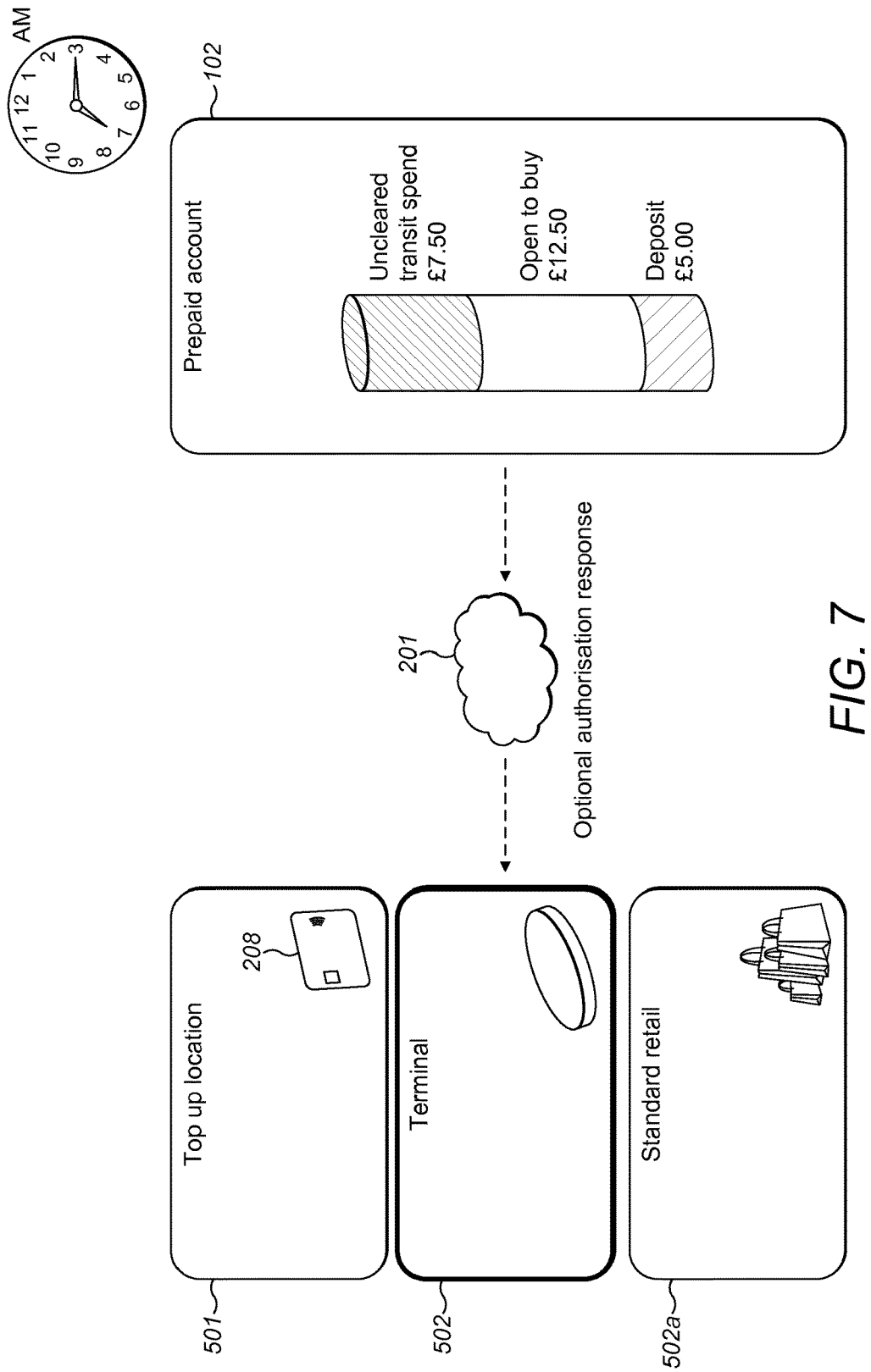

FIG. 7 shows the PPAM 102 sending an authorisation response back to the TAI 103 via intermediary network 201. The remaining open to buy (funds limit) may also be returned to the TAI 103. This may be retained by the transport payment terminal 502 for future use. Note that in this exemplary scenario the PPAM 102 has approved the transaction. In the event that the transaction were to be declined, the TAI 103 would typically add the user's card to the Deny List to prevent further travel.

Figure 8:
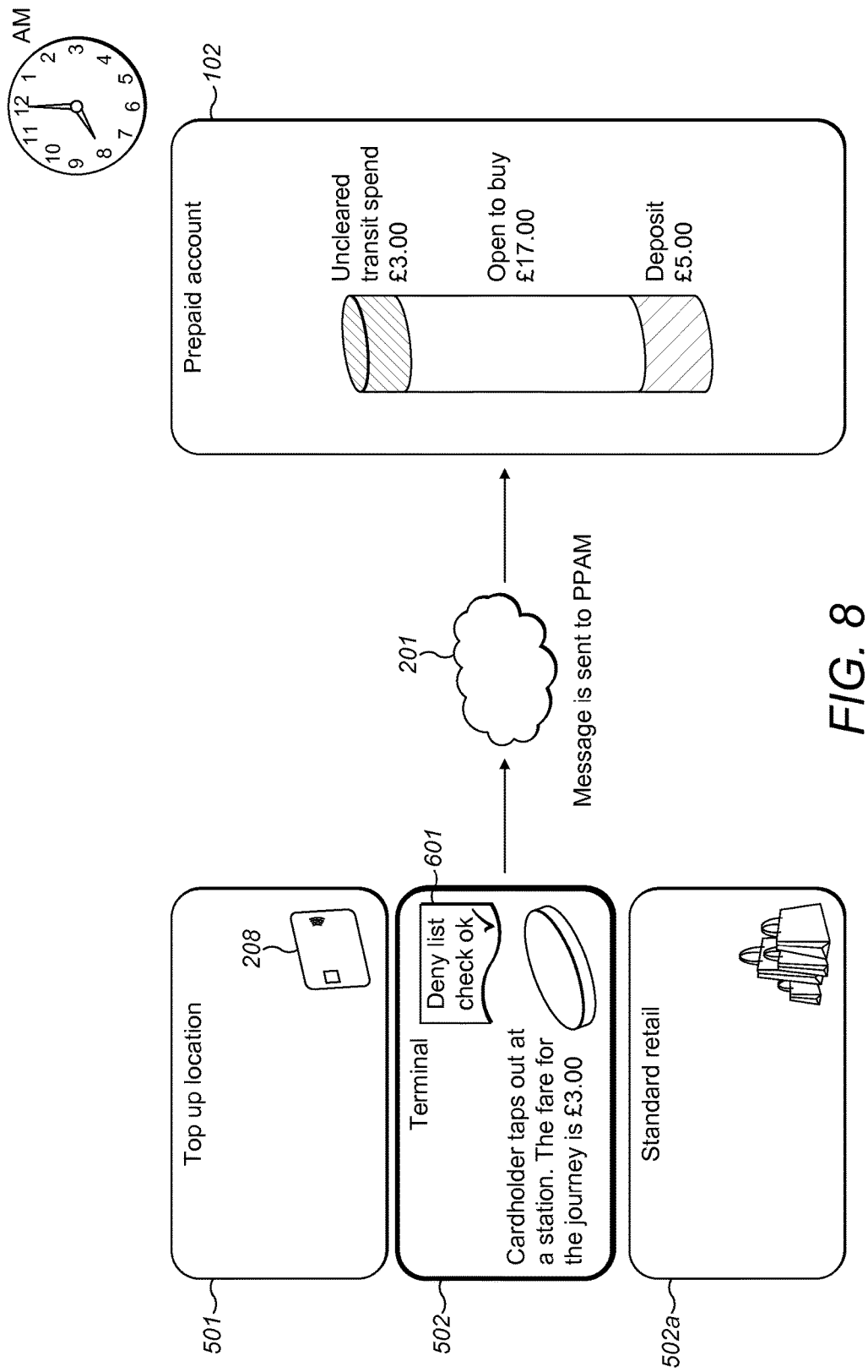

FIG. 8 shows the user 101 tapping their payment card 208 at a transport payment terminal 502 at the end of a journey ('tapping out'). The actual fare is worked out; which in this instance is £3, and is sent back to the PPAM 102 via the intermediary network 201. The PPAM then reduces the blocked/uncleared amount from £7.50 to £3. Here, any suitable adjustment may be made to account for any discrepancies between the nominal amount and the actual fare. The open to buy (funds limit) now stands at £17.

Figure 9:
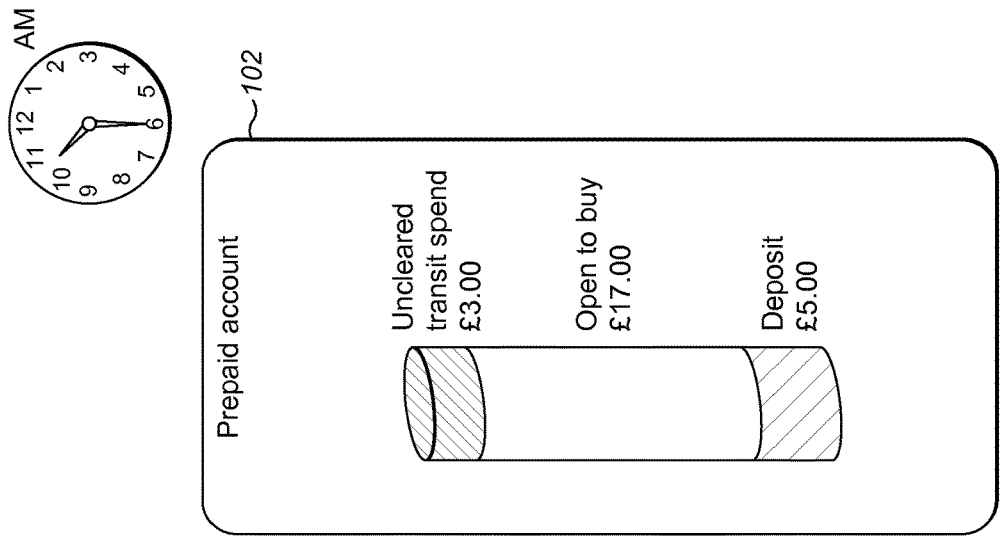
Figure 9:
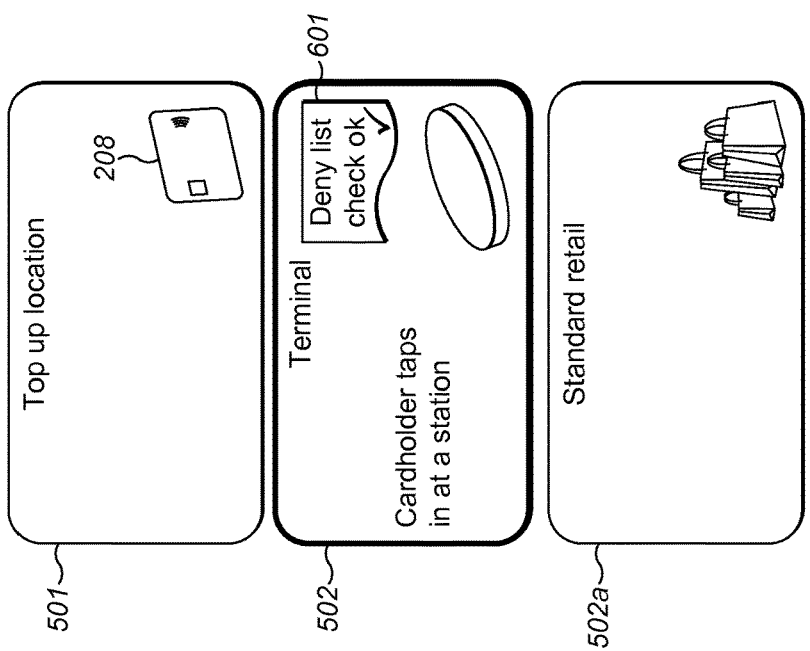

FIG. 9 shows a user 101 tapping their payment card 208 at a transport payment terminal 502 to begin a further journey ('tapping in'). In this instance, no messages are required to be sent between the TAI 103 and the PPAM 102 because a suitable authorisation or pre-authorisation request has already been sent. The PPAM 102 is already aware, because of the earlier transaction, that the cardholder is travelling, and they therefore permit the transit agency to allow further travel.

Figure 10:
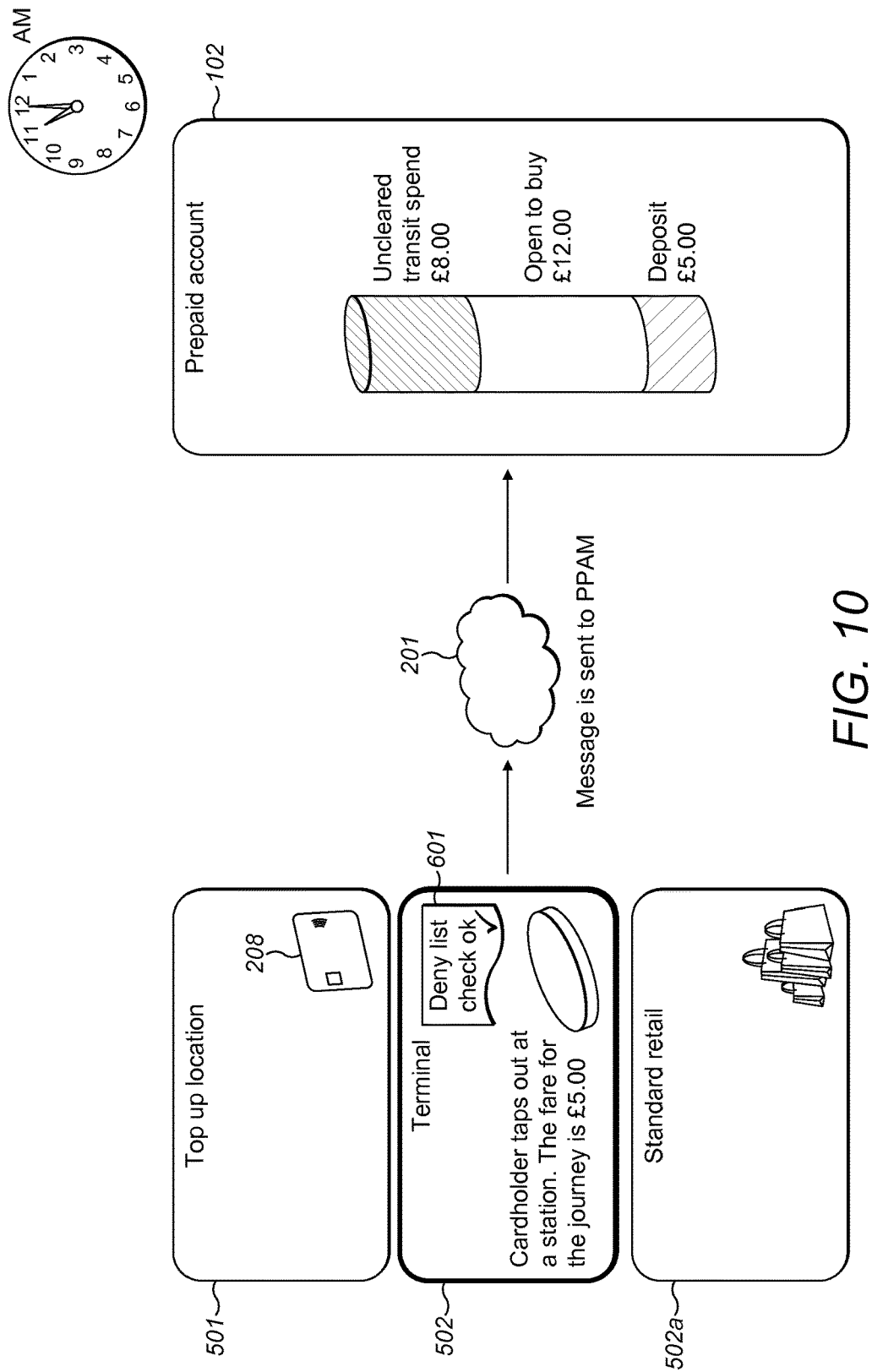

FIG. 10 shows the user 101 'tapping out'. The actual fare is communicated by the TAI 103 via the intermediate network 201 to the PPAM 102. In this instance, the fare is £5. The PPAM 102 then adjusts the blocked and open to buy (funds limit) amounts of the prepaid account accordingly, leaving £8 blocked and £12 open to buy.

Figure 11:
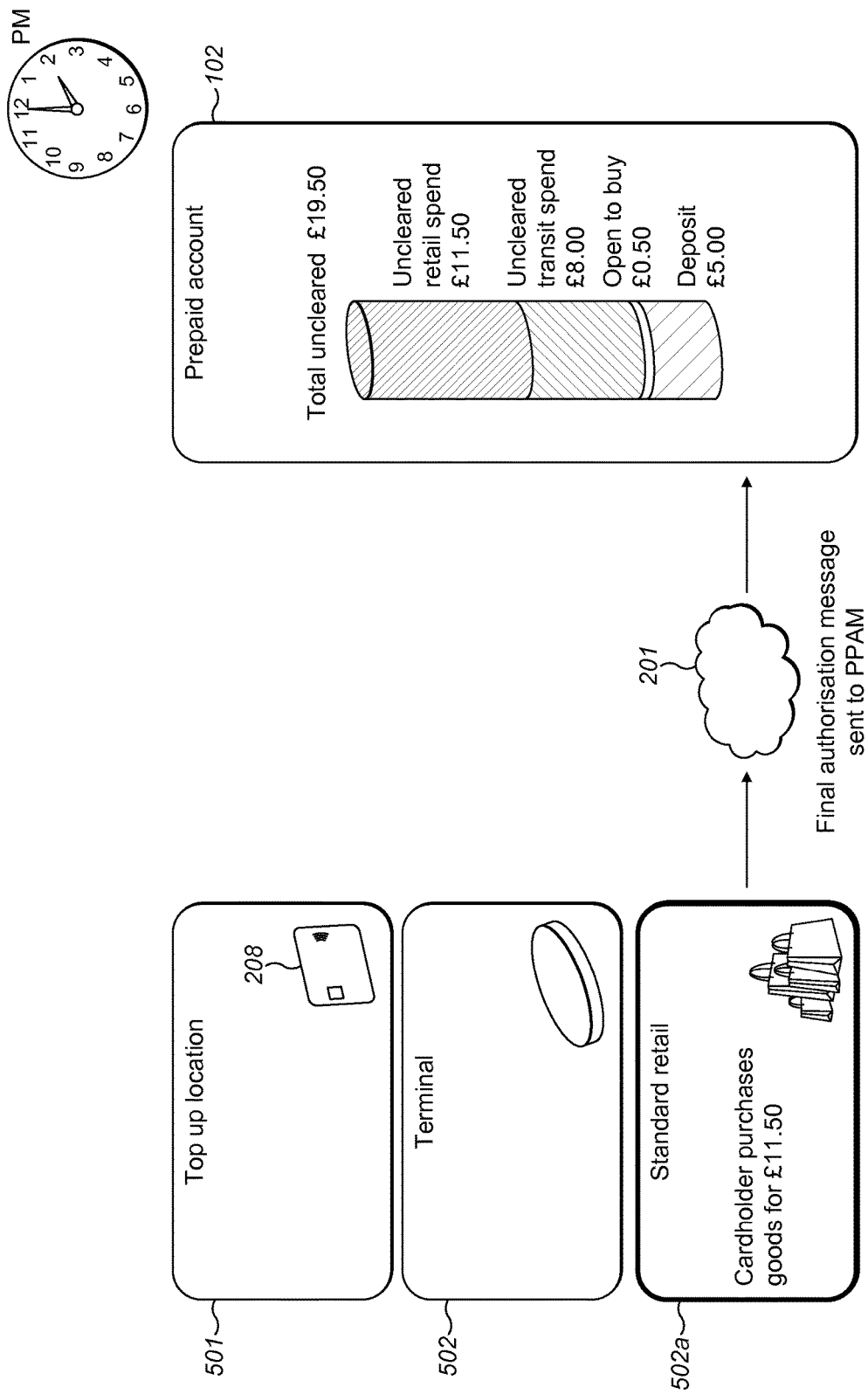

FIG. 11 shows the user 101 making a retail purchase using the payment card 208 at a retail purchase terminal 502*a*. A standard authorisation message is sent by the retail purchase terminal 502*a* via the intermediate network 201 to the PPAM 102 indicating the value of the purchase, which in this instance is £11.50. The PPAM 102 then blocks off a further amount, £11.50, from the open to buy as uncleared retail spend, leaving 50*p* in the open to buy.

Figure 12:
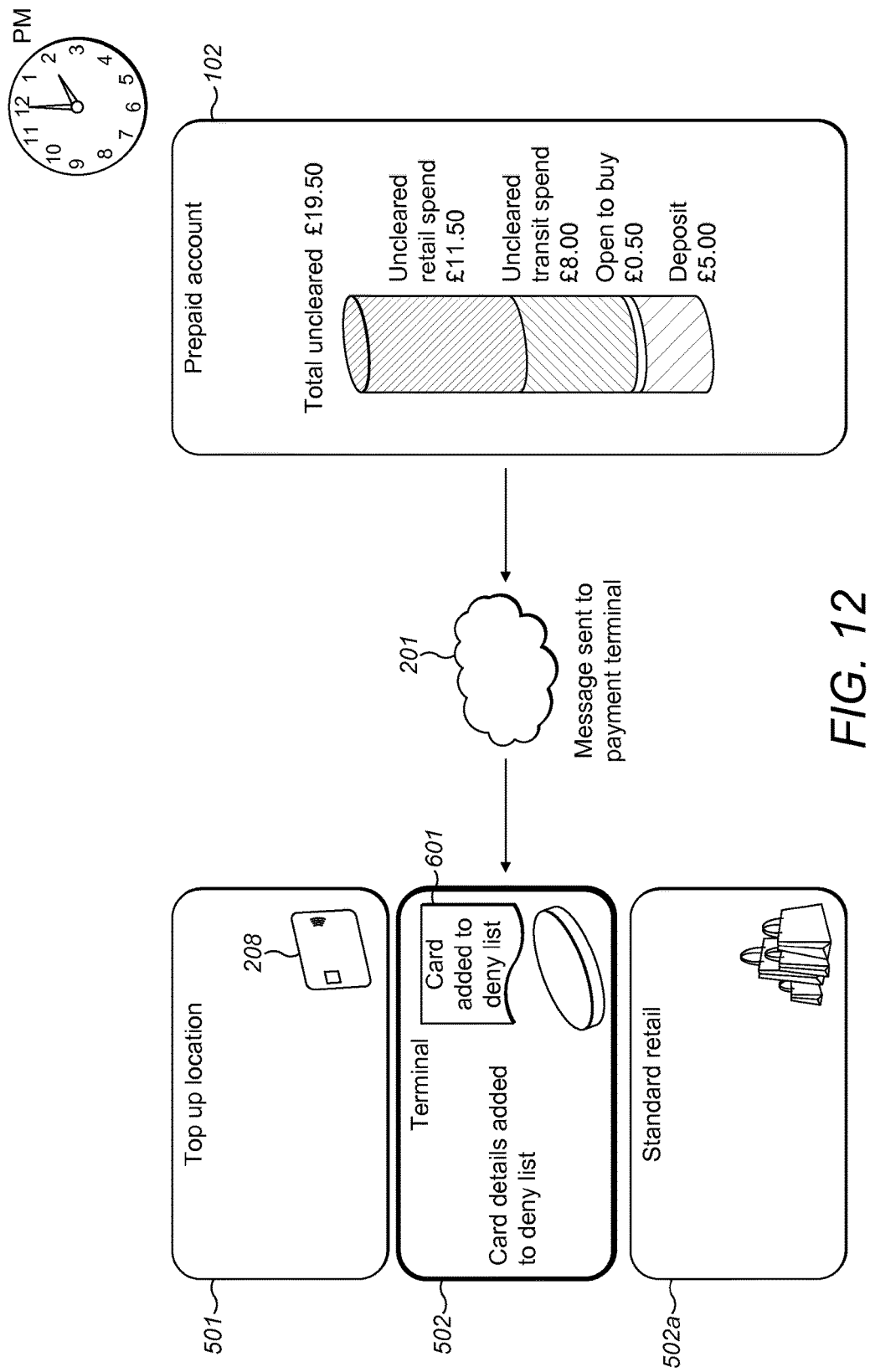

FIG. 12 shows the PPAM 102 sending a message to the TAI 103 via the intermediary network 201 indicating that there is now insufficient funds in open to buy (funds limit) of the prepaid account. The transport payment terminal 502 then adds the payment card 208 linked to the account to the Deny List. The updated Deny List is then communicated to the readers 502. This therefore allows the PPAM 102 and the TAI 103 to prevent the card being used for transportation until such time as the user 101 has made good their account 503 thereby reducing the associated liability risk for all parties involved, yet still providing a mechanism for a user to maintain a low balance and travel.

In an exemplary embodiment, there may be provided different Deny List thresholds corresponding to differing minimum fares usually associated with different modes of transport. As such, the payment card 208 may be on the Deny List for more expensive modes of transport, but may still be able to travel on cheaper modes of transport if sufficient funds are available in prepaid account 503 to pay for the minimum fare.

For example, a minimum train fare may be £3.50, but a bus fare may be £1.20. As such, a cardholder with £2.00 of open to buy in their PPAM account should be allowed to start a bus journey, but would not be allowed to start a train journey as their card has been added to a train Deny List for falling below the train Deny List threshold value.

Figure 13:
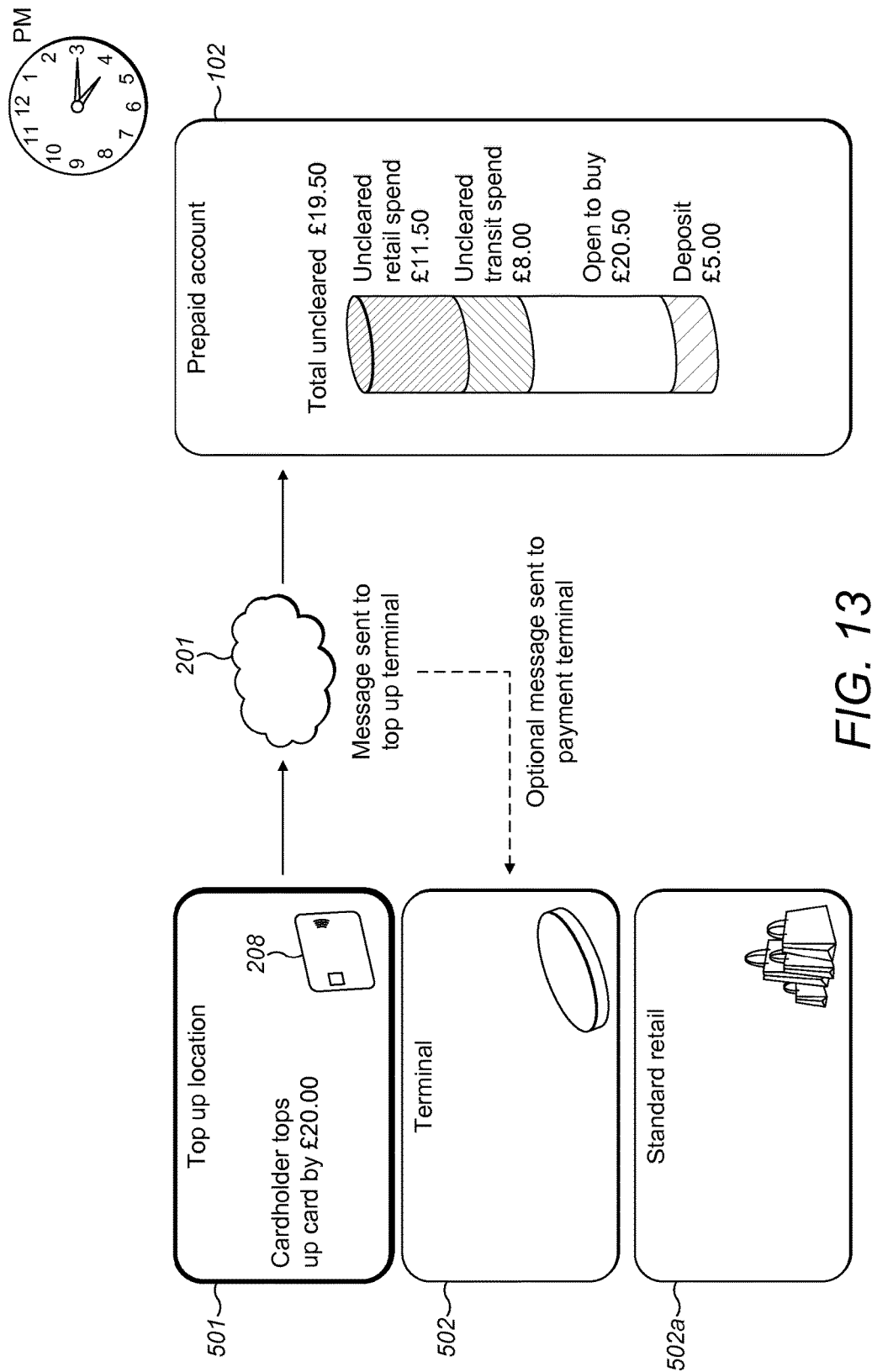

FIG. 13 shows the user topping up the card with a further £20 at top up terminal 501. A message is then sent by the top up terminal 501 to the PPAM 102 typically via intermediary network 201 indicating that a top up of £20 has been made. The PPAM 102 then adds an additional £20 to the open to buy (funds limit) in the prepaid account 503, which now stands at £20.50.

Optionally, the intermediary network 201 connecting the top up terminal 501 to the PPAM 102 and the TAI 103 may forward the message received from the top up terminal 501 indicating that a top up of £20 has been made directly to the TAI 103.

Figure 14:
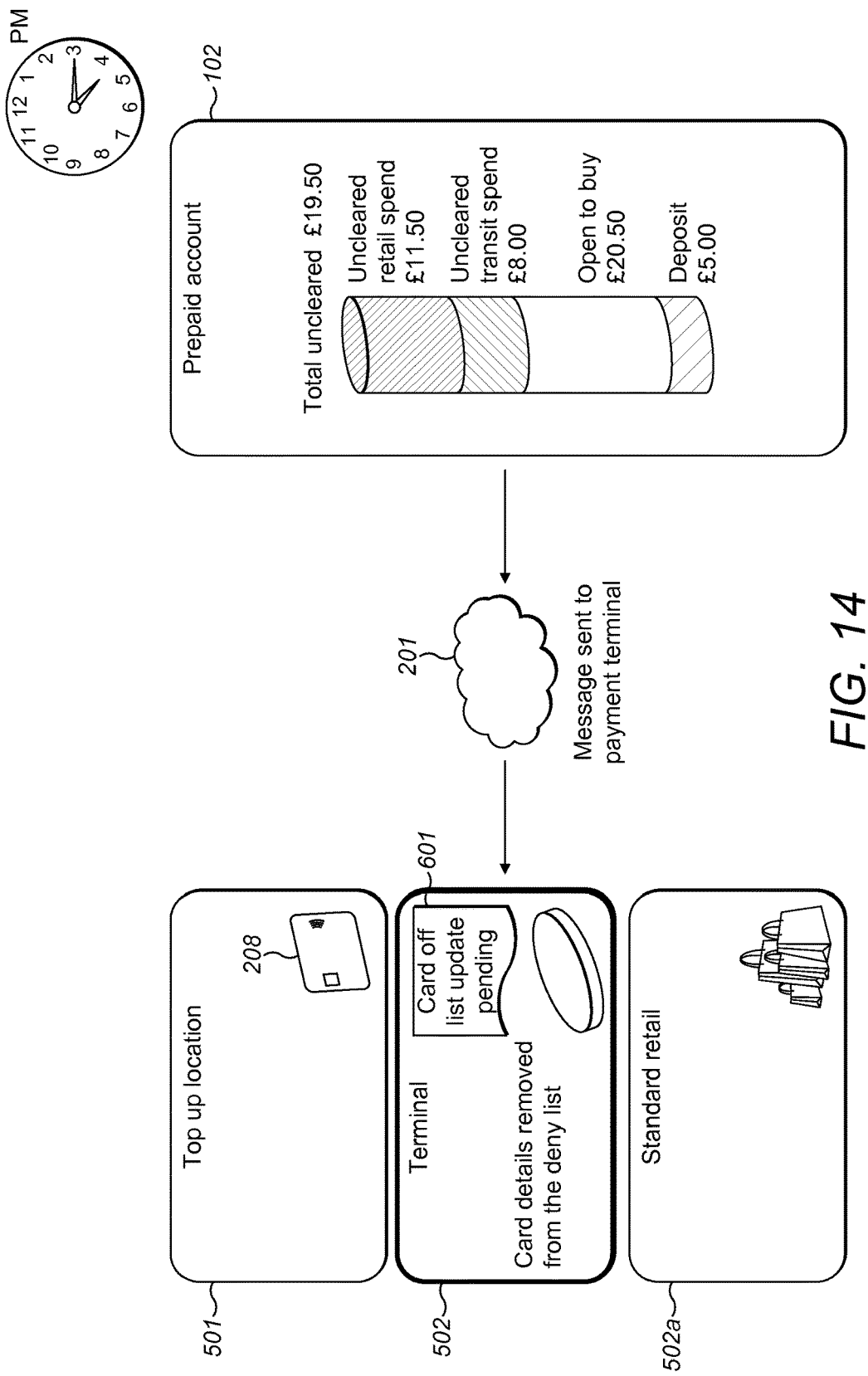

FIG. 14 shows the PPAM 102 sending a message to the TAI 103 indicating the current open to buy (available funds) of the prepaid account has been topped up (and optionally that it may now be above a threshold). The transit agency then decides, based on the transmitted information, whether the payment card 208 should be taken off the Deny List or, where multiple Deny Lists exist, all or selective ones of the Deny Lists.

This could be done selectively where multiple Deny Lists exist which are associated with different minimum fare values, dependent upon the open to buy (funds limit) following the top up.

Provided the payment card 208 is to be removed from the Deny List, the TAI 103 will then begin taking the payment card 208 off their Deny List. Depending on the communications infrastructure of the transit agency, this may take some time. Therefore, even though the card has been topped up, if the user's payment card 208 is still on the Deny List the user 101 when they start to travel, they will not be permitted to start their journey.

Once the payment card 208 is removed from the Deny List, no further pre-authorisation request is triggered/required as the payment card 208 is purpose-issued and the previous aggregation may simply resume.

Figure 15:
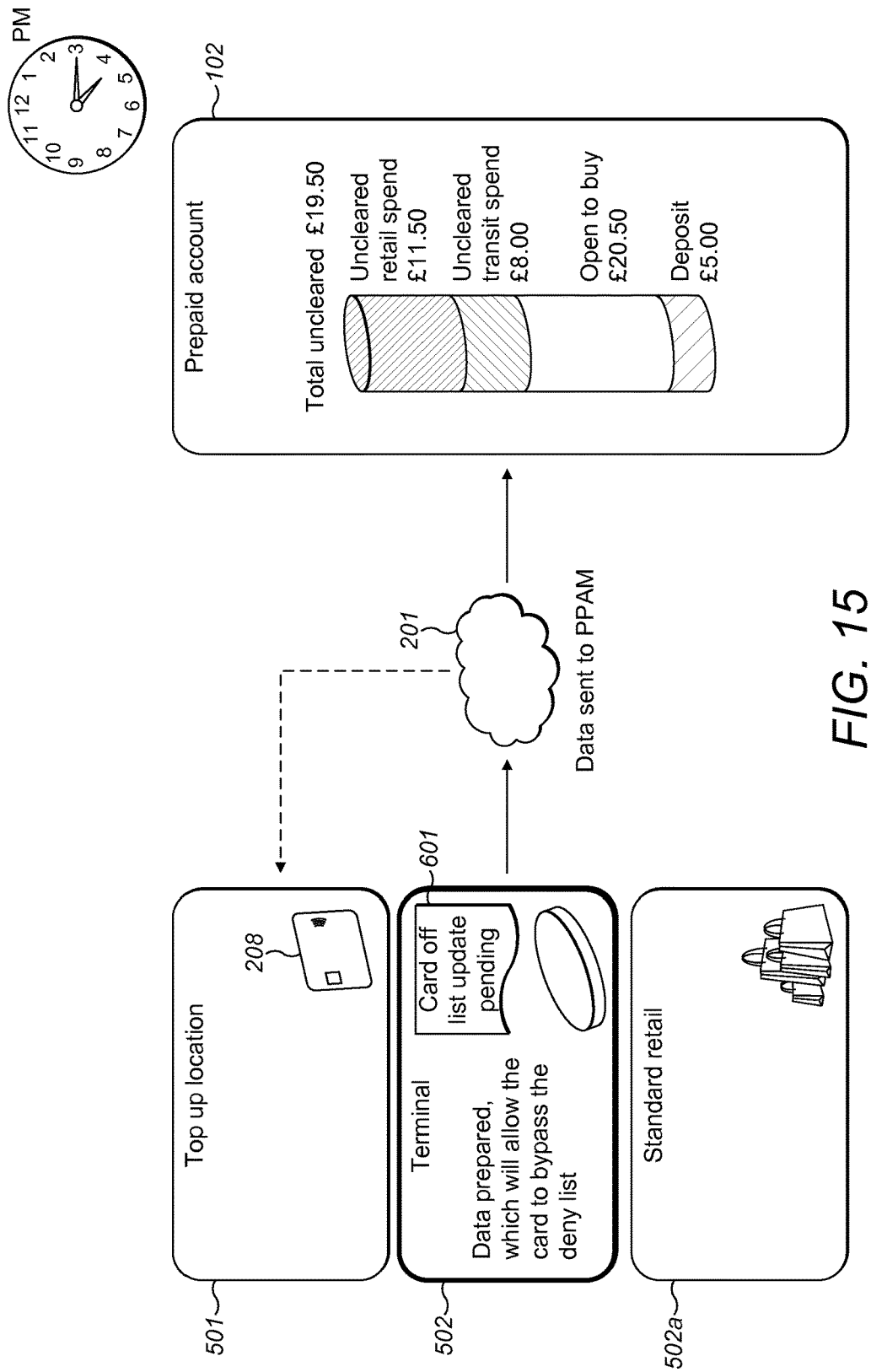

FIG. 15 shows Deny List bypassing data being created at the TAI 103 following the decision of the transit agency to remove the payment card 208 from the Deny List or Lists. The Deny List bypassing data enables a payment card 208 to be used at a terminal even if the card is still on the Deny List. This is achieved through the TAI 103 preparing a piece of data and ultimately writing it back to the payment card 208. Once the data is securely written to the card (which may be done using existing techniques), then if that card is presented in the transit system whilst it is still on the Deny List, then this piece of data allows the payment card 208 to bypass the Deny List check and the card holder is granted access to the system. The fact that the bypassing data is on the card indicates to the TAI 103 and the terminal 502 that the payment card 208 and the associated account 503 are once again in good standing and that in this instance it is in fact safe to override the Deny List check.

Where multiple Deny Lists exist which are associated with different minimum fare values, the Deny List bypassing data could selectively bypass Deny Lists dependent upon the open to buy (funds limit) of the prepaid account 503.

The Deny List bypassing data is then sent to the PPAM 102 via intermediary network 201.

Alternatively, the intermediary network 201 connecting the top up terminal 501 to the PPAM 102 and the transport payment terminal 502 may allow the TAI 103 to send the Deny List bypassing data directly to the top up terminal 501.

Figure 16:
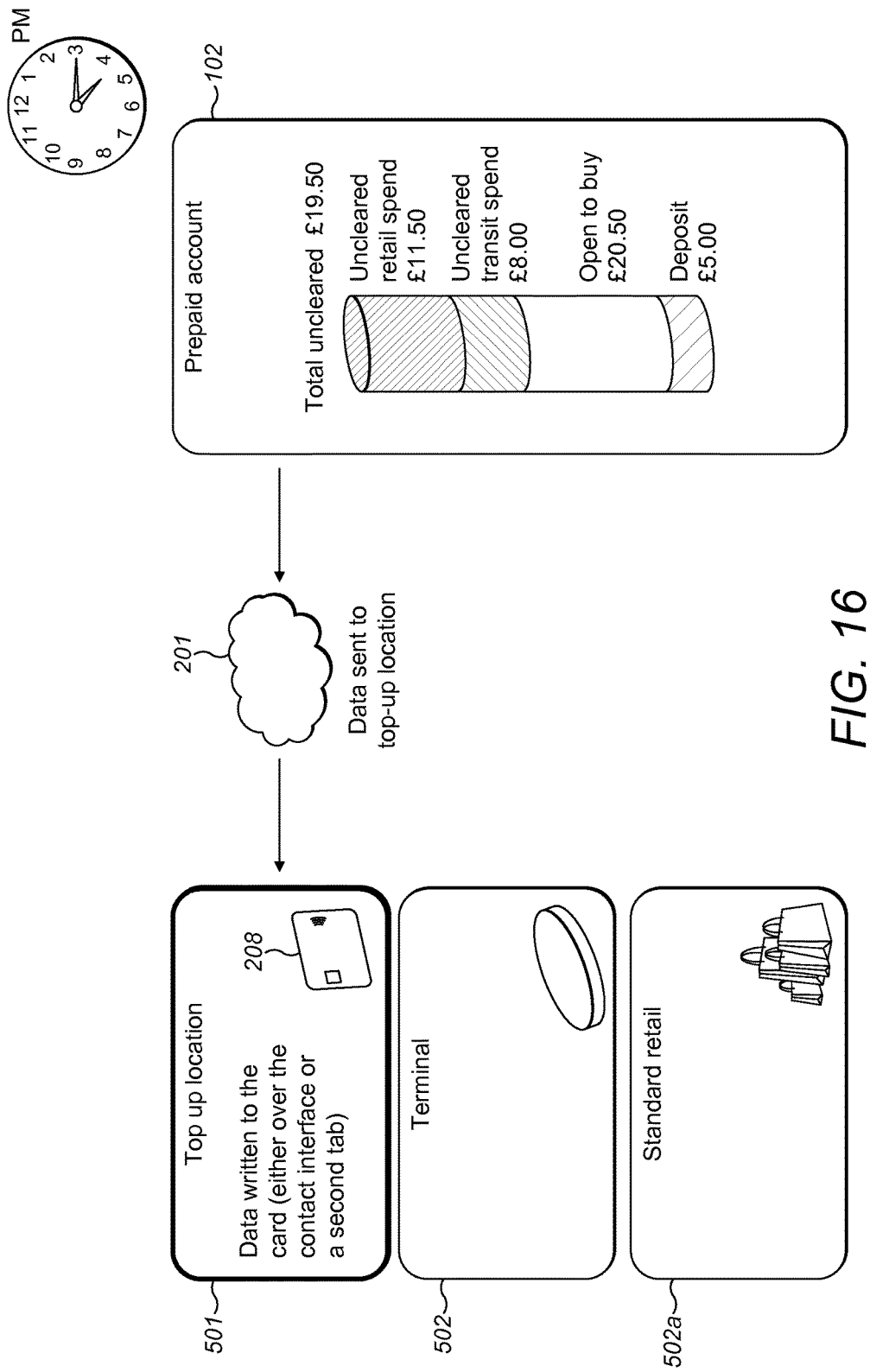

FIG. 16 shows the PPAM 102 sending the Deny List bypassing data to the top up terminal 501 via intermediary network 201. The Deny List bypassing data is then written to the payment card 208 either over a contact interface or the contactless interface. The process of writing data securely to a payment card 208 may use existing methods.

Figure 17:
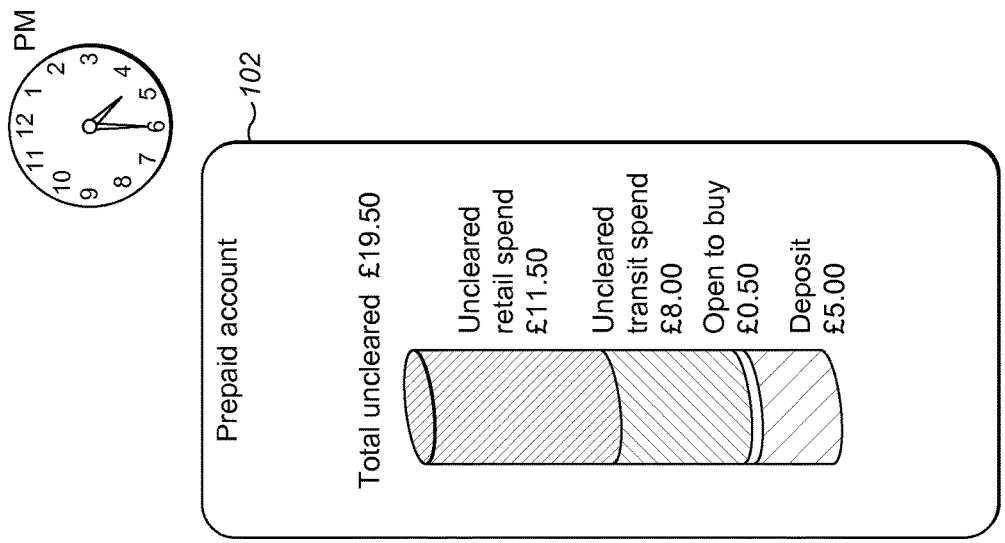
Figure 17:
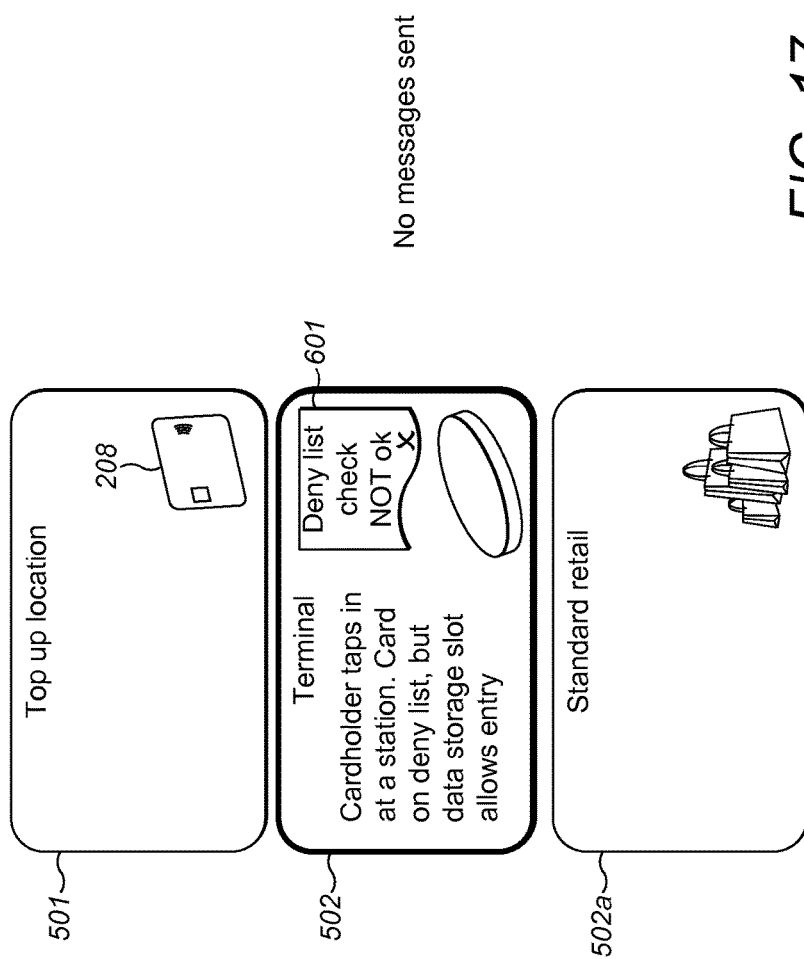

FIG. 17 shows the user 101 tapping the payment card 208 at the transport payment terminal ('tapping in') 502 after a successful top-up with enough funds for travel, but before the payment card 208 has been removed from the Deny List or Deny Lists at the transport payment terminal 502. Previously, the user would have to have waited for the Deny List to be updated at the transport payment terminal 502 before they would be permitted to travel, but the Deny List bypassing data bypasses the Deny List and the user 101 is allowed to commence their journey.

Figure 18:
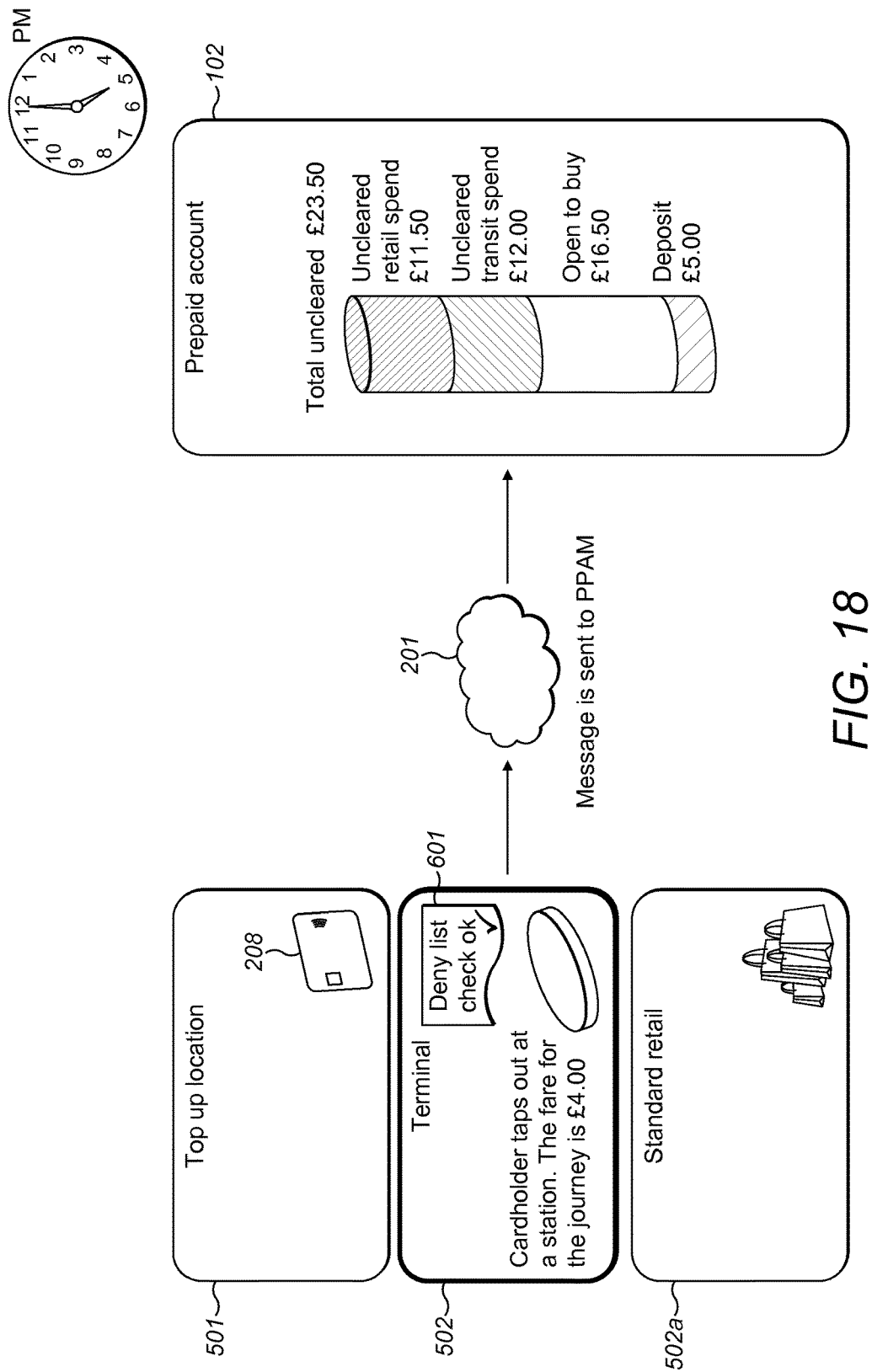

FIG. 18 shows the user 101 'tapping out' having completed their journey, which in this instance cost £4. The actual fare is sent back to the PPAM 102 via the intermediary network 201. The PPAM then changes the blocked/uncleared amount accordingly to a total of £23.50 leaving £16.50 of funds available.

Figure 19:
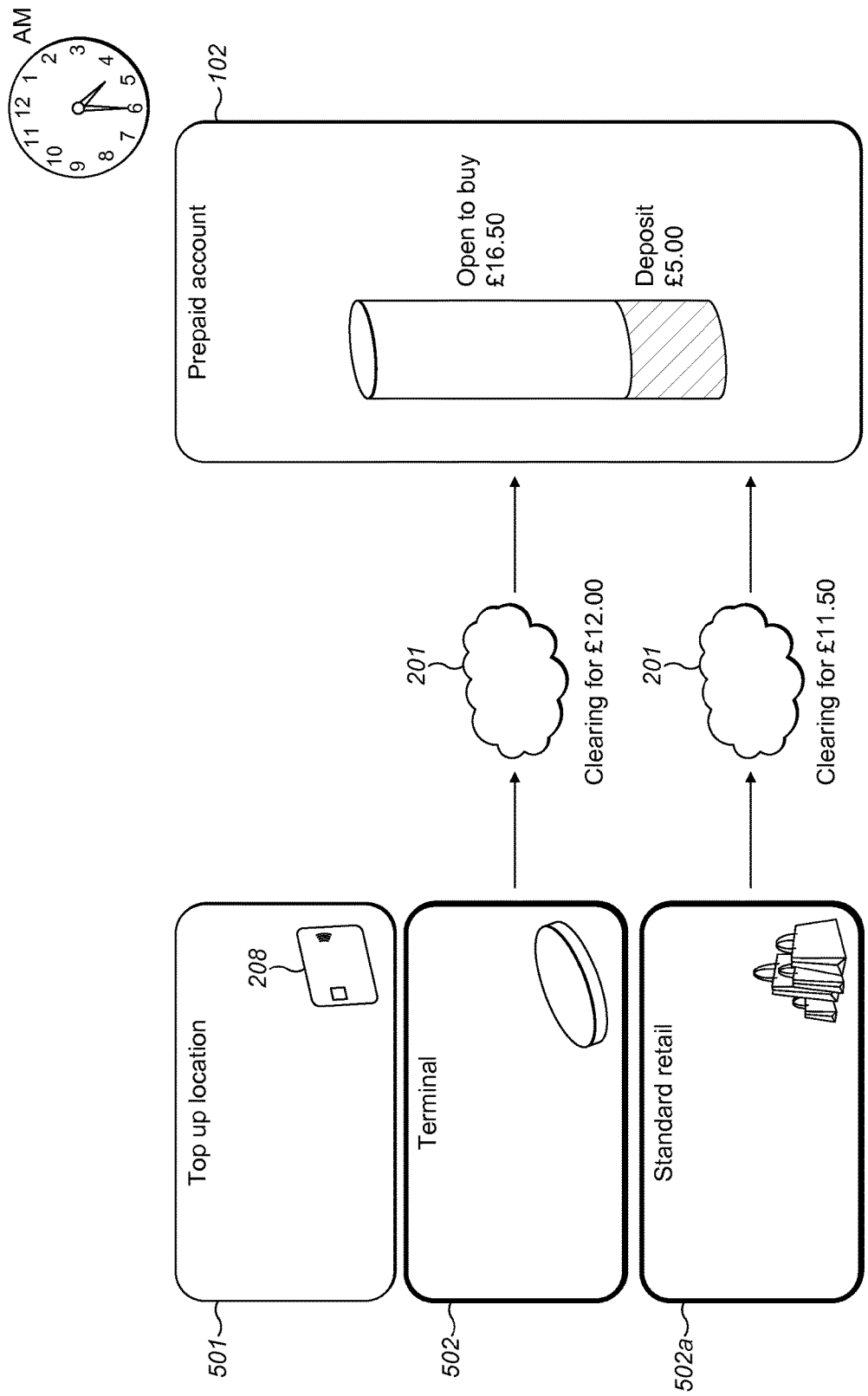

FIG. 19 shows the end of day clearing processes which take place at the end of the day clearing the uncleared amounts, leaving only the remaining £16.50 open to buy (funds limit) in the account, together with the deposit of £5.

Figure 20:
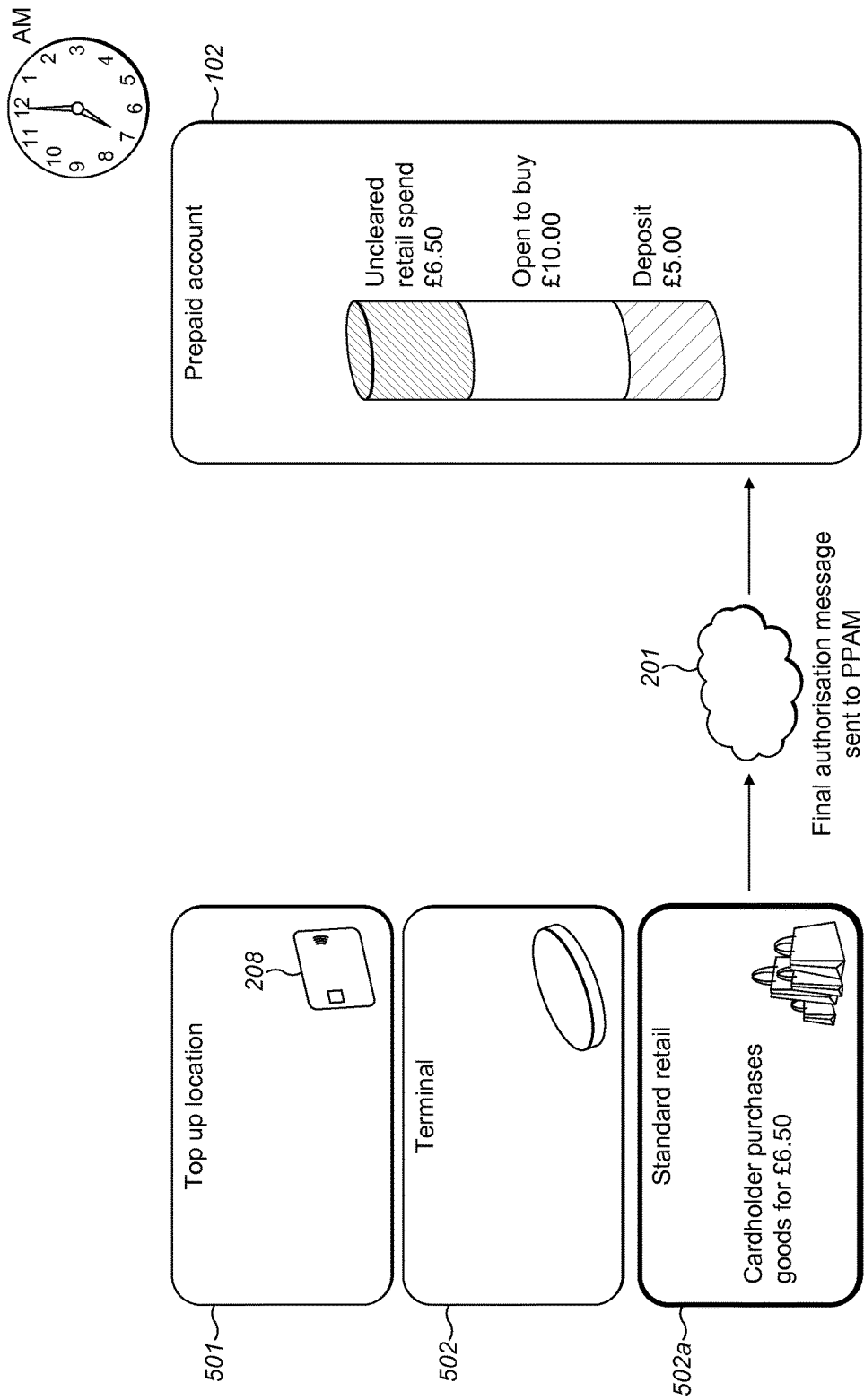

FIG. 20 shows a retail purchase being made by user 101 with a payment card 208 the next day. A standard authorisation request is sent by the retail payment terminal 502a to the PPAM 102 for a £6.50 purchase and the blocked/uncleared amount is adjusted accordingly to £6.50, leaving £10 in the open to buy (available funds).

Figure 21:
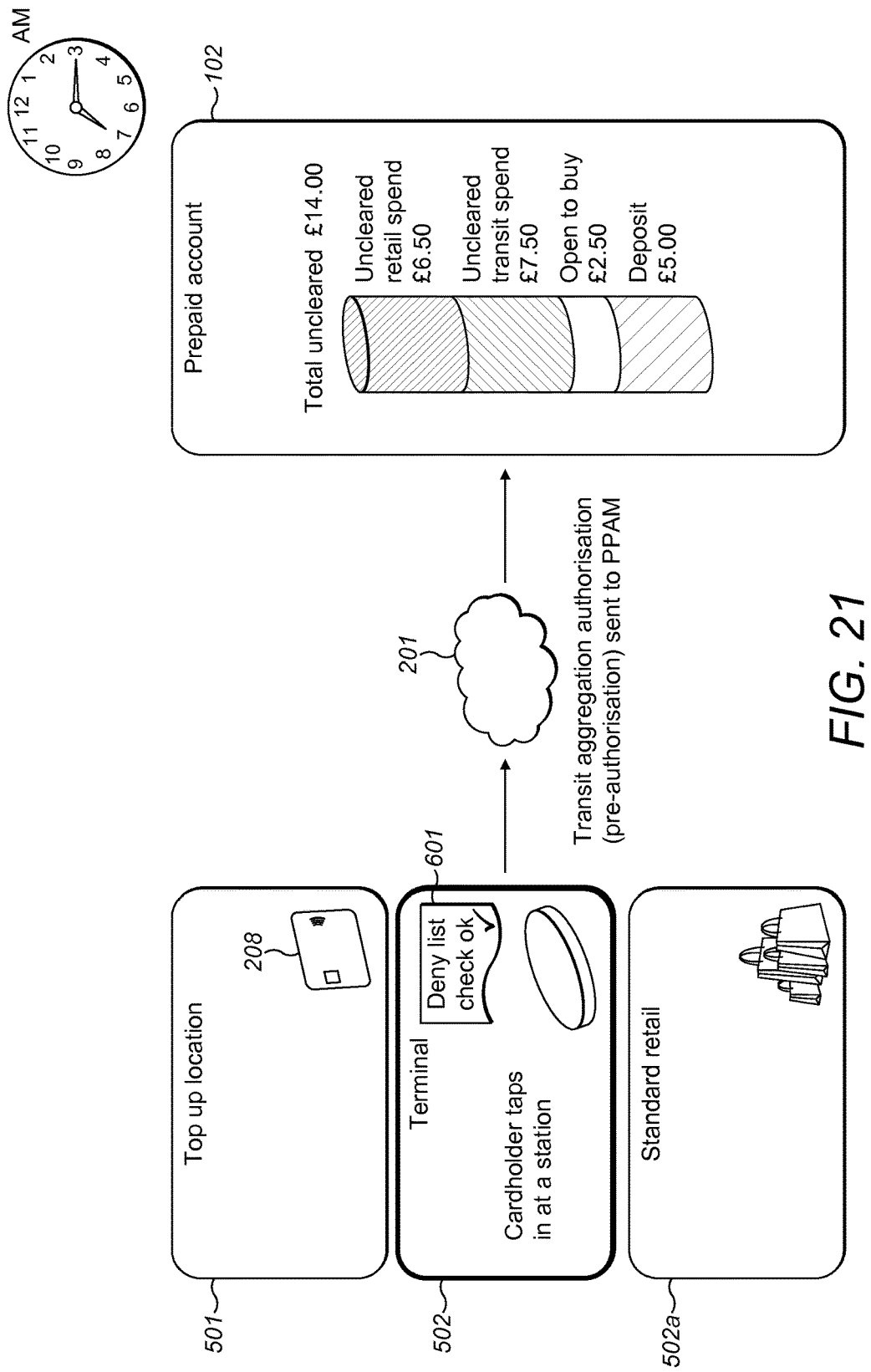

FIG. 21 shows a user 101 subsequently tapping their payment card 208 at a transport payment terminal 502 to begin a journey ('tapping in'). Here the standard card checks are performed and the card is checked against a Deny List 601. If the checks are successful the user 101 is allowed to commence their journey. The TAI 103 then sends a transit aggregation authorisation (or pre-authorisation) request to the PPAM 102 via the intermediary network 201.

Again, a nominal amount representing a normal maximum fare at the TAI 103 is sent to the PPAM 102 alongside the pre-authorisation. An exemplary amount would be £7.50. The PPAM 102 then blocks that £7.50 from the open to buy (funds limit) of the prepaid account, leaving £2.50 in the open to buy.

Figure 22:
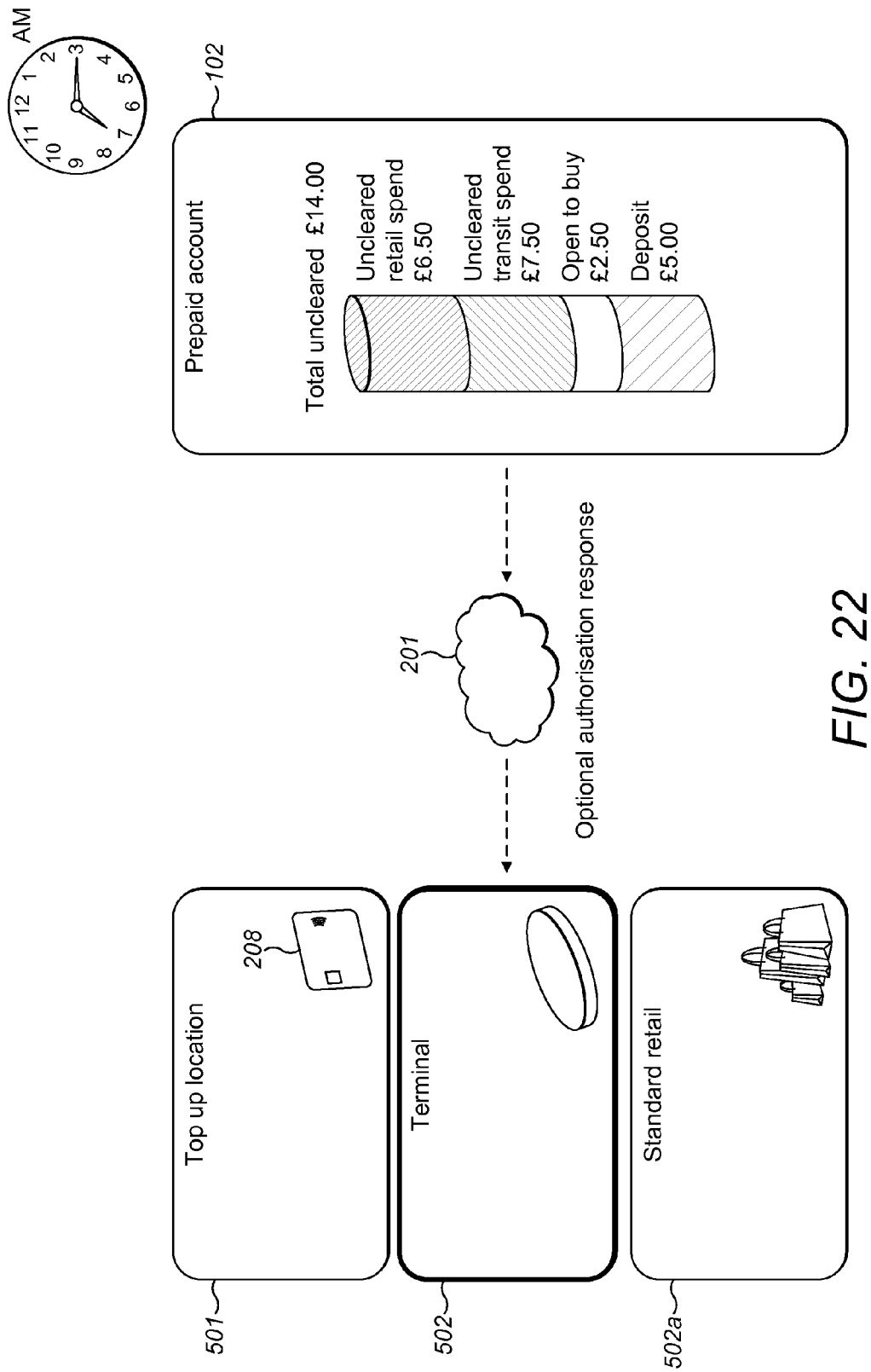

FIG. 22 shows the PPAM 102 sending an authorisation response back to the TAI 103 via intermediary network 201. Again, the remaining open to buy (funds limit) may also be returned to the TAI 103.

Figure 23:
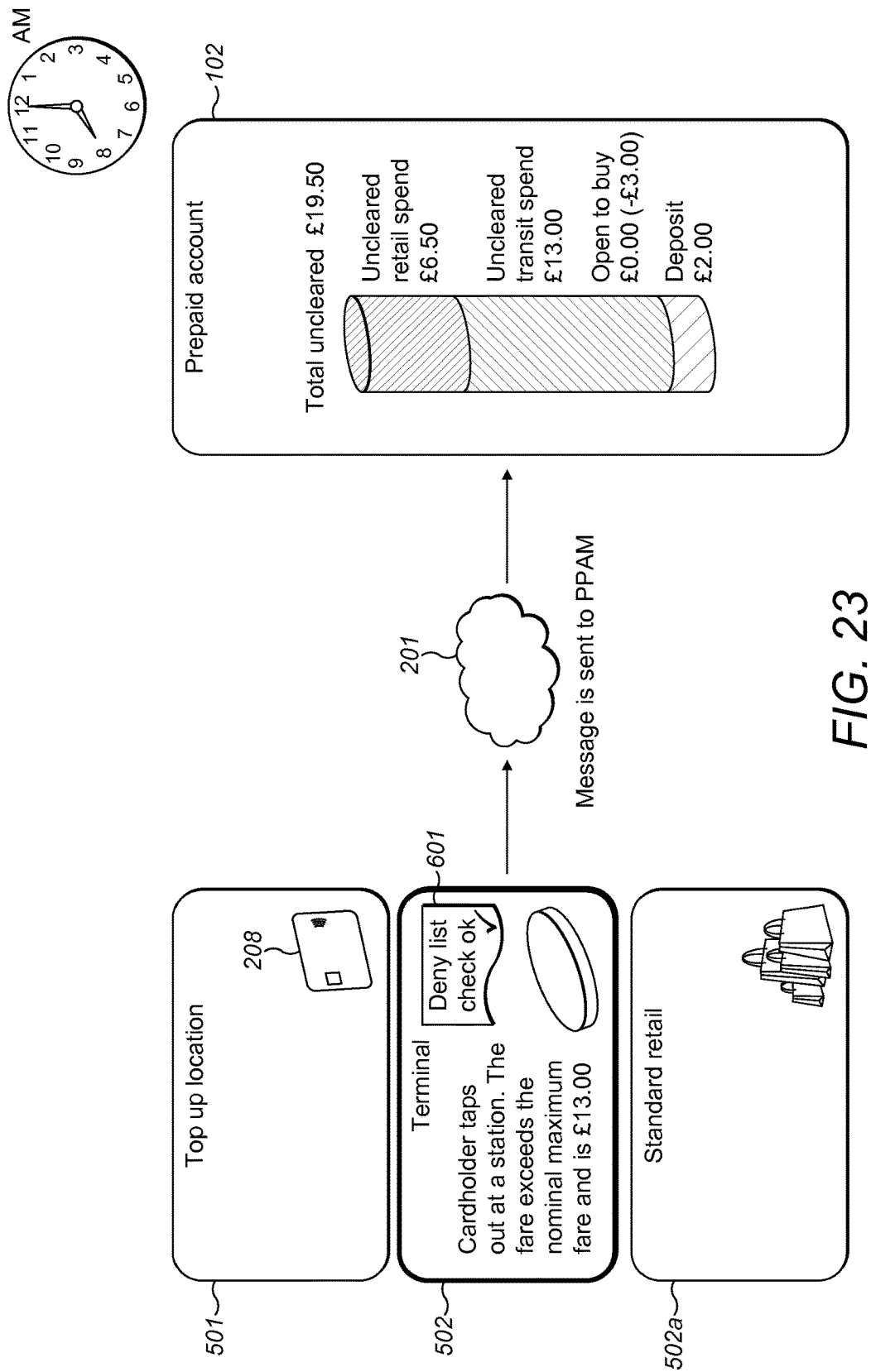

FIG. 23 shows the user 101 tapping their payment card 208 at a transport payment terminal 502 at the end of a journey ('tapping out'). The actual fare is worked out, which in this instance is £13, and this is sent back to the PPAM 102 via the intermediary network 201. This exceeds the remaining open to buy (funds limit) and leaves only £2 of the deposit amount remaining (and a 'negative' open to buy of −£3).

Figure 24:
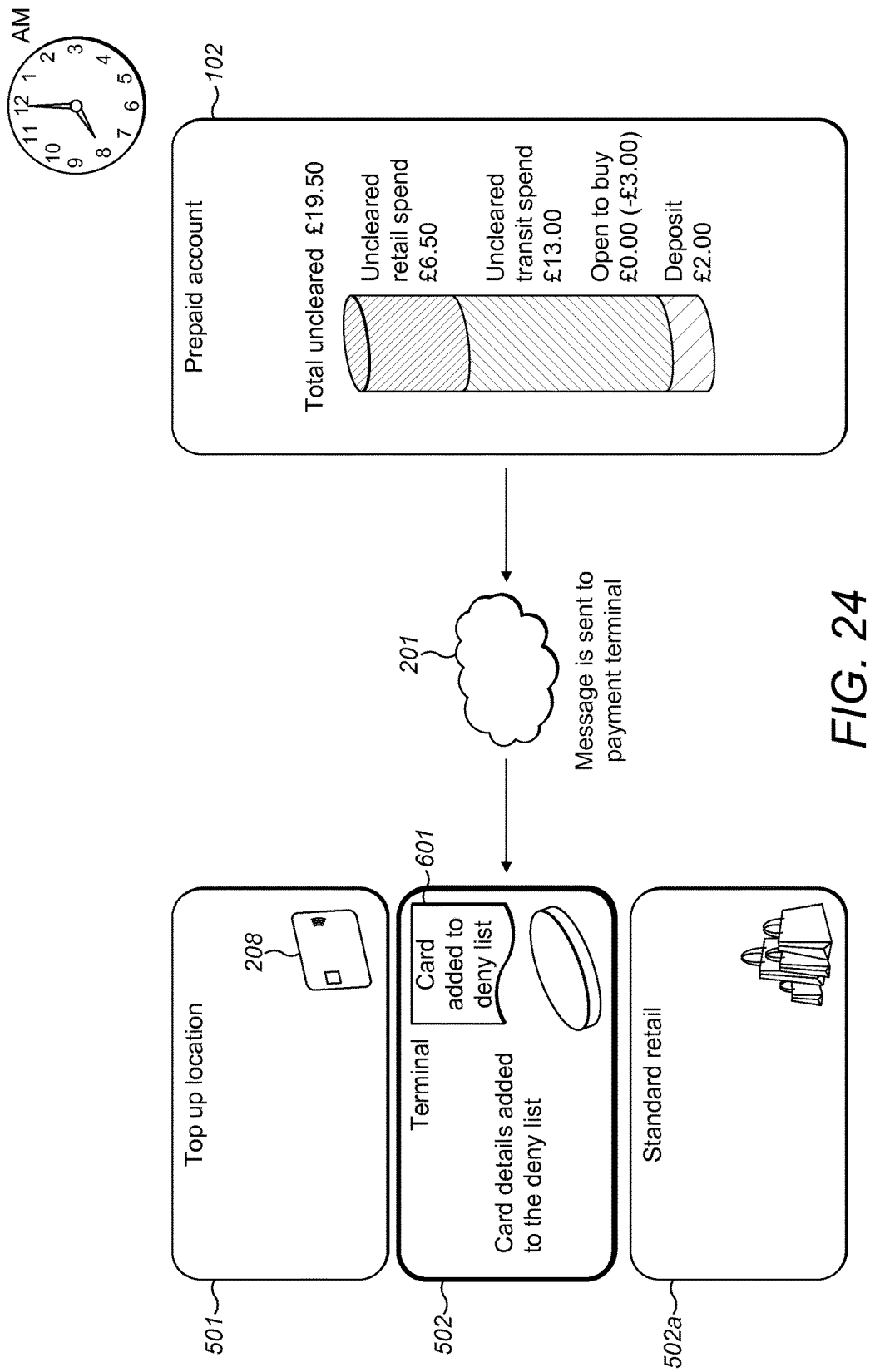

FIG. 24 shows the PPAM 102 subsequently sending a message to the TAI 103 via the intermediary network 201 indicating that there are now insufficient funds for the minimum fare. As a result, the payment card 208 would be placed on the Deny List at the terminal 502, as in the process described by reference to FIG. 12.

The above mentioned process for removing the card from the Deny List as described by reference to FIGS. 13 to 16 may be repeated and the user 101 may continue to use their payment card 208. In this instance, any amount topped up to the card must first be used to pay off any spend in the deposit of the card before updating the open to buy with the remaining balance. For example, if the balance were −£2.00 (£2.00 of the deposit used) and the top up were for £20, the result would be a deposit of £5.00 and an open to buy of £18.

The TAI 103 may itself be considered to be a terminal which consists of its constituent entities as outlined above.

The flow charts and descriptions thereof herein should not be understood to prescribe a fixed order of performing the method steps described therein. Rather, the method steps may be performed in any order that is practicable. Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

The invention claimed is:

1. A computer implemented method of using a payment card network to rapidly update a payment account deny list, the method comprising the steps of:

receiving, by a payment account manager (PAM) processor, a first message directly from a top up terminal indicating that funds have been transferred to the payment account;

setting or adjusting a funds limit of the payment account by the PAM processor based on information in the first message;

receiving by the PAM processor, directly from a first terminal, an authorisation or pre-authorisation request and commencing a funds aggregation responsive to the authorisation or pre-authorisation request;

receiving by the PAM processor, directly from the first terminal, a second message indicating a pre-defined amount of funds which may be used in the transaction;

blocking by the PAM processor an amount of the funds limit of the payment account equivalent to the pre-defined amount;

sending an authorisation response by the PAM processor directly to the first terminal;

placing the payment account on a deny list at the first terminal by the PAM processor when an unblocked amount of the funds limit is less than a minimum possible actual amount of funds used;

sending an additional message directly from the top up terminal to the first terminal and to the PAM processor, indicating that further funds have been transferred to the payment account; and removing the payment account from the deny list at the first terminal in response to the additional message.

2. The method of claim 1, further comprising the steps of:

receiving a third message from a second terminal indicating an actual amount of funds used; and adjusting the blocked amount of the funds limit of the payment account if the actual amount of funds used differs from the pre-defined amount.

3. The method of claim 1, further comprising the step of:

sending a message to the first terminal indicating an updated, unblocked amount of the funds limit.

4. The method of claim 3, wherein the message indicating the updated, unblocked amount of the funds limit is only sent if the unblocked funds limit falls below or rises above a threshold amount.

5. The method of claim 1, further comprising the step of:

continuing with the funds aggregation following removal of the payment account from the deny list.

6. The method of claim 1, wherein the funds limit of the payment account is set based on information detailing any existing funds in the payment account as well as information in the first message.

7. The method of claim 1, wherein the pre-defined blocked amount of the funds limit is equivalent to either an average value or a maximum value or a typical maximum value for the actual amount of funds used at the first terminal.

8. The method of claim 1, wherein the step of setting or adjusting the funds limit additionally takes into account any deposit that may previously have been paid into the payment account.

9. The method of claim 1, further comprising the step of:

sending the funds aggregation and clearing the payment account of any remaining blocked funds and adjusting the funds limit accordingly.

10. The method of claim 1, wherein the authorisation or pre-authorisation request and the second message comprise a single message.

\* \* \* \* \*